(12) United States Patent
Morgan et al.

(10) Patent No.: US 12,289,359 B2
(45) Date of Patent: *Apr. 29, 2025

(54) HIDDEN DESKTOP SESSION FOR REMOTE ACCESS

(71) Applicant: ConnectWise, LLC, Tampa, FL (US)

(72) Inventors: Jacob Morgan, Raleigh, NC (US);
Mayfield Reynolds, Raleigh, NC (US);
Meng Huang, Morrisville, NC (US)

(73) Assignee: ConnectWise, LLC, Tampa, FL (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/167,569

(22) Filed: Feb. 10, 2023

(65) Prior Publication Data

US 2023/0319127 A1  Oct. 5, 2023

Related U.S. Application Data

(63) Continuation-in-part of application No. 17/295,794, filed as application No. PCT/US2019/055927 on Oct. 11, 2019, now Pat. No. 11,582,287.

(60) Provisional application No. 62/755,728, filed on Nov. 5, 2018, provisional application No. 62/745,049, filed on Oct. 12, 2018.

(51) Int. Cl.
*H04L 67/025*   (2022.01)
*G06F 9/451*   (2018.01)

(52) U.S. Cl.
CPC ............ *H04L 67/025* (2013.01); *G06F 9/452* (2018.02)

(58) Field of Classification Search
CPC ........ G06N 5/025; G06N 7/005; G06F 17/18; H04L 41/5048; H04L 41/5054; H04L 43/08; H04L 41/16; H04L 41/142; H04L 43/16; H04L 41/145
See application file for complete search history.

(56) References Cited

U.S. PATENT DOCUMENTS

| | | | |
|---|---|---|---|
| 7,647,391 B1 * | 1/2010 | Jean ................... | G06Q 10/087 709/224 |
| 8,996,642 B1 | 3/2015 | Bellini et al. | |
| 11,233,853 B1 * | 1/2022 | Gafa ................... | H04L 67/125 |
| 2003/0065731 A1 | 4/2003 | Mohammed et al. | |

(Continued)

OTHER PUBLICATIONS

Foreign Search Report on PCT PCT/US2019/055927 DTD Jan. 8, 2020.

(Continued)

*Primary Examiner* — Karen C Tang
(74) *Attorney, Agent, or Firm* — Foley Hoag LLP; John Lanza; Joshua S. Matloff

(57) ABSTRACT

Systems and methods of the present disclosure are directed to providing remote access capabilities in information technology infrastructure. In particular, systems and methods of the present disclosure can establish a connection between a remote computing device and a host computing device, transition a system session of the remote computing device to an interactive state, display a hidden desktop within the transitioned system session, and present a user interface on the hidden desktop. The user interface can include an icon that launches a second application of the remote computing device within the transitioned system session. In response to a command from the host computing device, the hidden desktop can be terminated.

20 Claims, 20 Drawing Sheets

(56) References Cited

U.S. PATENT DOCUMENTS

| | | | |
|---|---|---|---|
| 2007/0171921 A1 | 7/2007 | Wookey et al. | |
| 2007/0174429 A1 | 7/2007 | Mazzaferri et al. | |
| 2007/0266135 A1 | 11/2007 | Friedland et al. | |
| 2008/0288301 A1 | 11/2008 | Emling et al. | |
| 2009/0070151 A1* | 3/2009 | Sellari | G06Q 40/06 705/36 R |
| 2011/0209064 A1* | 8/2011 | Jorgensen | G06F 9/455 709/227 |
| 2011/0213821 A1 | 9/2011 | Gentile et al. | |
| 2012/0324365 A1* | 12/2012 | Momchilov | G06F 3/14 715/738 |
| 2016/0134616 A1* | 5/2016 | Koushik | H04L 63/0428 726/9 |
| 2017/0054765 A1* | 2/2017 | Tucker | H04L 67/01 |
| 2017/0126718 A1* | 5/2017 | Baradaran | H04L 63/0281 |
| 2018/0060572 A1 | 3/2018 | Singleton et al. | |
| 2018/0108022 A1 | 4/2018 | Bandera et al. | |
| 2018/0129510 A1* | 5/2018 | Zhang | G06F 3/1423 |
| 2018/0365039 A1* | 12/2018 | Kohler | G06F 9/45558 |
| 2019/0158353 A1* | 5/2019 | Johnson | G06F 16/95 |
| 2020/0081726 A1* | 3/2020 | Sherman | G06F 3/0484 |
| 2020/0082024 A1* | 3/2020 | Chauhan | H04L 63/168 |
| 2020/0097138 A1* | 3/2020 | Jacobson | G06F 3/04845 |
| 2020/0099738 A1* | 3/2020 | Borkar | H04L 67/63 |
| 2020/0104191 A1* | 4/2020 | Attard | G06F 16/957 |

OTHER PUBLICATIONS

Non-Final Office Action on U.S. Appl. No. 16/600,060 DTD Oct. 6, 2020.
Notice of Allowance on U.S. Appl. No. 16/600,060 DTD Mar. 22, 2021.
Notice of Allowance on U.S. Appl. No. 17/295,794 DTD Jan. 10, 2023.
Notice of Allowance on U.S. Appl. No. 17/295,794 DTD Aug. 24, 2022.
US Notice of Allowance on US DTD Sep. 7, 2022.

* cited by examiner

User interface 140

List of remote computing devices 142
- Remote computing device 122
- Remote computing device 146
- Remote computing device 148

FIG. 1B

Role Name: Control Administrator
Role Name cannot be changed after initially creating the role

Global Permissions:
- ☑ Administer
- ☑ CreateSupportSession
- ☑ BuildAccessInstaller
- ☑ ManageSessionGroups
- ☑ CreateMeetingSession
- ☑ ManageSharedToolbox

Scoped Permissions:

| AllSessionGroups | Select All | Unselect All |
|---|---|---|
| ▽ SupportSessionGroups | ☑ ViewSessionGroup | |
|    All Sessions | ☑ ViewSessionGuestScreenshot | |
|    My Sessions | ☑ JoinSession | |
|    Requested Sessions | ☑ DeleteSession | |
| ▽ MeetingSessionGroups | ☑ TransferSession | |
|    All Meetings | ☑ EditSession | |
|    My Meetings | ☑ RunCommandOutsideSession | |
| ▽ AccessSessionGroups | ☑ AddNoteToSession | |
|    ▷ All Machines by Company | ☑ RemoveNoteFromSession | |
|    ▷ All Machines by OS | ☑ RemoveCommandFromSession | |
|    Outdated Clients | ☑ ReinstallSession | |
|    Host Connected | ☑ UninstallSession | |
|    Guest Connected | ☑ TransferFilesInSession | |
|    Recently Accessed | ☐ PrintInSession | |
|    Offline | ☑ RunSharedToolInSession | |
|    Acme | ☑ HostSessionWithoutConsent | |
|    ▷ By Company, site and department | ☑ ManagedCredentials | |
| | ☑ SwitchLogonSession | |
| | ☑ CreateDelegatedAccessToken | |
| | ☑ EnableBackstageLogonSession | |

— 505

[SAVE ROLE] — 510

Show Reference

FIG. 5

HIDDEN DESKTOP SESSION FOR REMOTE ACCESS

CROSS-REFERENCE TO RELATED APPLICATIONS

This application is a continuation-in-part of U.S. patent application Ser. No. 17/295,794, filed May 20, 2021, which is a U.S. National Stage under 35 U.S.C. § 371 of International Patent Application No. PCT/US2019/055927, filed Oct. 11, 2019 and designating the United States, which claims the benefit of priority under 35 U.S.C. § 119 to U.S. Provisional Patent Application No. 62/755,728, filed on Nov. 5, 2018, and claims the benefit of priority under 35 U.S.C. § 119 to U.S. Provisional Patent Application No. 62/745,049, filed Oct. 12, 2018, each of which are hereby incorporated by reference herein in their entirety.

FIELD OF THE DISCLOSURE

The present disclosure generally relates to providing remote access in information technology infrastructure. In particular, systems and methods of the present disclosure can provide a hidden desktop session that can be used for remote access to information technology infrastructure in order to remotely control capabilities to facilitate the management, configuration, or maintenance of information technology infrastructure.

BACKGROUND OF THE DISCLOSURE

Information technology infrastructure can include computing devices, networking devices, peripherals, accessories, or other devices that are connected to the network. Devices can malfunction or fail from time-to-time. However, due to the large number of devices, their remote location, the various types of devices, it can be challenging to actively monitor and manage the devices to efficiently remedy or address a malfunction or failure.

SUMMARY OF THE DISCLOSURE

Systems and methods of the present disclosure are directed to providing remote access in information technology infrastructure. In particular, systems and methods of the present disclosure can provide a virtual hidden desktop that can be used for remote access to information technology infrastructure in order to remotely control capabilities to facilitate the management, configuration, or maintenance of information technology infrastructure.

For example, the system can provide a web application having an interface with a command tab. The command tab can allow hosts to run commands against their guest machines from the web application. To provide greater interaction with the command prompt, and a fully interactive shell that allows for the performance of operations without disturbing the end user, the technical solution of the present disclosure provides a hidden desktop or backstage feature.

For example, a backstage component executing on one or more of the remote machine, host machine, or cloud server, can be configured to generate, create, initiate, launch or spawn a virtual or hidden desktop operating in the system session (e.g., session 0) of an end user's computing device. Such a hidden desktop can sometimes be referred to as a hidden desktop session. The backstage component can spawn the hidden desktop session responsive to when a host machine (e.g., a computing device operated by a technician or administrator) connects to a remote machine (e.g., a computing device operated by an end user). This hidden desktop session can launch a power shell, such as an automated task framework with a command line shell and a scripting language integrated into the .NET framework, which can be embedded within other applications. This hidden desktop session can also launch a command window by default. This hidden desktop session can also launch other applications, including interactive applications with a graphical user interface (GUI). The applications, including but not limited to the power shell and command window, can allow the host machine to access and work on the remote machine without interrupting the end user (e.g., who may be operating the remote machine), and without revealing the end user's display on the remote machine to the host machine.

Applications that may execute during the hidden desktop session include a taskbar, which can include one or more icons that launch applications within the hidden desktop session. The taskbar may be executed when the hidden desktop initiated. The taskbar can include a menu, a search function, and additional user interfaces to kill individual process trees, launch additional instances of processes, or close graphical user interfaces (e.g., windows) that are presented in the hidden desktop by the applications launched via the taskbar. Menus presented by the taskbar can present lists of files, programs, or other software present on the end user's computing device. The creation of a taskbar within the hidden desktop session enables technicians to provide further control over applications that provide GUIs. Thus, technicians can manage, debug, and remediate issues remotely through a host client interface of the technical solution of the present disclosure with a full interactive graphical user interface, in addition to a power shell and command window, without interfering with or observing the work of the end user.

At least one aspect of the present technical solution is directed to a method of remotely managing computing devices. The method can include identifying, by a remote management server, a first remote computing device according to a first support ticket. The method can include establishing, by the remote management server, one or more connections communicatively coupling the first remote computing device to a host computing device. The method can include hijacking, by the remote management server via the one or more established connections, a system session executed on the first remote computing device. The method can include transitioning, by the remote management server via the one or more established connections, the hijacked system session from a non-interactive state to an interactive state. The method can include generating, by the remote management server, a hidden desktop within the hijacked system session to be displayed on a display device of the host computing device. The method can include identifying, by the remote management server, one or more instructions inputted through the hidden desktop by the host computing device to update a configuration of the first remote computing device. The method can include terminating, by the remote management server responsive to a command from the host computing device, the hijacked system session by transitioning the hijacked system session from the interactive state to the non-interactive state.

In some embodiments, the method can further include closing, by the remote management server, the first support ticket in response to the one or more instructions being executed in a hidden manner the hijacked system session of the first remote computing device.

In some embodiments, the method can further include receiving, by the remote management server from a database storing the first support ticket associated with a first remote computing device, responsive to the first remote computing device generating the first support ticket. The method can further include receiving, by the remote management server from the database storing a second support ticket associated with either the first remote computing device or a second remote computing device, the second support ticket responsive to the first or second remote computing device generating the second support ticket. The method can further include determining, by the remote management server communicating with the database, a first priority of the first support ticket based on a first status of the first support ticket. The method can further include determining, by the remote management server communicating with the database, a second priority of a second support ticket based on a second status of the second support ticket. The method can further include determining that the first priority is higher than the second priority to identify the first remote computing device.

In some embodiments, transitioning the hijacked system session from a non-interactive state to an interactive state can further include adding, by the remote management server via the one or more established connections, a registry key to a registry of the first remote computing device to cause the hijacked system session to transition from the non-interactive state to the interactive state.

In some embodiments, the hidden desktop may include at least one of an interactive power shell and an interactive command prompt.

In some embodiments, the method can further include communicating, by the remote management server, with one or more web applications to provide one or more interactive user interfaces on the hidden desktop.

In some embodiments, the method can further include composing, by the remote management server, one or more windows stations within the hijacked system session to generate the hidden desktop.

In some embodiments, the method can further include transmitting, by the remote management server via the one or more established connections, the one or more instructions to the first remote computing device for execution in a hidden manner to close the first support ticket.

In some embodiments, the one or more instructions may be inputted through the hidden desktop by one or more input devices communicatively coupled to the host computing device.

In some embodiments, the method can further include providing, by the remote management server, one or more toolboxes to launch one or more web applications on the hidden desktop.

At least one aspect of the present technical solution is directed to a system that can remotely manage computing devices. The system can include a remote management server that includes one or more processors and memory. The remote management server can identify a first remote computing device according to a first support ticket. The remote management server can establish one or more connections communicatively coupling the first remote computing device to a host computing device. The remote management server can hijack a system session executed on the first remote computing device via the one or more established connections. The remote management server can transition the hijacked system session from a non-interactive state to an interactive state. The remote management server can generate a hidden desktop within the hijacked system session to be displayed on a display device of the host computing device. The remote management server can identify one or more instructions inputted through the hidden desktop by the host computing device to update a configuration of the first remote computing device. The remote management server can, responsive to a command from the host computing device, terminate the hijacked system session by transitioning the hijacked system session from the interactive state to the non-interactive state.

In some embodiments, the remote management server can further close the first support ticket in response to the one or more instructions for execution in a hidden manner in the hijacked system session of the first remote computing device.

In some embodiments, the remote management server can further add a registry key to a registry of the first remote computing device to cause the hijacked system session to transition from the non-interactive state to the interactive state.

In some embodiments, the hidden desktop may include at least one of an interactive power shell and an interactive command prompt.

In some embodiments, the remote management server can further communicate with one or more web applications to provide one or more interactive user interfaces on the hidden desktop.

In some embodiments, the remote management server can further compose one or more windows stations within the hijacked system session to generate the hidden desktop.

In some embodiments, the remote management server can further transmit the one or more instructions via the one or more established connections to the first remote computing device for execution in a hidden manner to close the first support ticket.

In some embodiments, the one or more instructions may be inputted through the hidden desktop by one or more input devices communicatively coupled to the host computing device.

In some embodiments, the remote management server can further provide one or more toolboxes to launch one or more web applications on the hidden desktop.

In some embodiments, the remote management server can receive, from a database storing the first support ticket associated with a first remote computing device, the first support ticket responsive to the first remote computing device generating the first support ticket. The remote management server can receive, from the database storing a second support ticket associated with either the first remote computing device or a second remote computing device, the second support ticket responsive to the first or second remote computing device generating the second support ticket. The remote management server can determine a first priority of the first support ticket based on a first status of the first support ticket. The remote management server can determine a second priority of a second support ticket based on a second status of the second support ticket. The remote management server can determine that the first priority is higher than the second priority to identify the first remote computing device.

Yet another aspect of the present disclosure is directed to a method. The method may be performed, for example, by a remote management server. The method includes establishing a connection between a remote computing device and a host computing device. The method includes transitioning a system session executing on the remote computing device to an interactive state. The method includes displaying, on the host computing device, a hidden desktop within the transitioned system session. The method includes presenting a user interface on the hidden desktop. The user interface includes an icon that launches a second application of the remote computing device within the transitioned system session. The method includes terminating the hidden desktop responsive to a command from the host computing device.

In some implementations, presenting the user interface includes presenting a plurality of icons that each launch a respective application of the remote computing device within the transitioned system session.

In some implementations, the method includes presenting, on the host computing device, a second icon in the user interface that presents a second user interface comprising a list of files stored on the remote computing device.

In some implementations, the method includes presenting, on the host computing device, a second icon in the user interface that presents a second user interface comprising a field that accepts text input.

In some implementations, the method includes presenting a menu within the hidden desktop having entries to terminate the second application, launch a second instance of the second application, and close the menu.

In some implementations, the method includes determining that a permission associated with the host computing device permits access to the hidden desktop.

In some implementations, the method includes identifying, by the remote management server, the remote computing device based on a support ticket.

In some implementations, the method includes updating a status of the support ticket based on instructions executed within the system session executing on the remote computing device.

In some implementations, transitioning the system session executing on the remote computing device to the interactive state includes modifying a registry of an operating system of the remote computing device.

In some implementations, the method includes terminating the hidden desktop in response to an interaction with a second icon presented in the user interface.

Another aspect of the present disclosure is directed to a system. The system includes a remote management server. The remote management server includes one or more processors executing instructions stored in memory. The remote management server can establish a connection between a remote computing device and a host computing device. The remote management server can transition a system session executing on the remote computing device to an interactive state. The remote management server can display, on the host computing device, a hidden desktop within the transitioned system session. The remote management server can present a user interface on the hidden desktop, the user interface comprising an icon that launches a second application of the remote computing device within the transitioned system session. The remote management server can terminate, responsive to a command from the host computing device, the hidden desktop.

In some implementations, the remote management server presents the user interface by presenting a plurality of icons that each launch a respective application of the remote computing device within the transitioned system session.

In some implementations, the remote management server presents, on the host computing device, a second icon in the user interface that presents a second user interface comprising a list of files stored on the remote computing device.

In some implementations, the remote management server presents, on the host computing device, a second icon in the user interface that presents a second user interface comprising a field that accepts text input.

In some implementations, the remote management server presents a menu within the hidden desktop having entries to terminate the second application, launch a second instance of the second application, and close the menu.

In some implementations, the remote management server determines that a permission associated with the host computing device permits access to the hidden desktop.

In some implementations, the remote management server identifies the remote computing device based on a support ticket.

In some implementations, the remote management server updates a status of the support ticket based on instructions executed within the system session executing on the remote computing device.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

FIGS. 1B-1G are illustrative operations or graphical user interfaces provided by the system depicted in FIG. 1A;

FIG. 5 depicts an illustrative graphical user interface that may be utilized to adjust permissions corresponding to computing devices within the system shown in FIG. 1A.

DETAILED DESCRIPTION OF THE DISCLOSURE

Figure 1A:
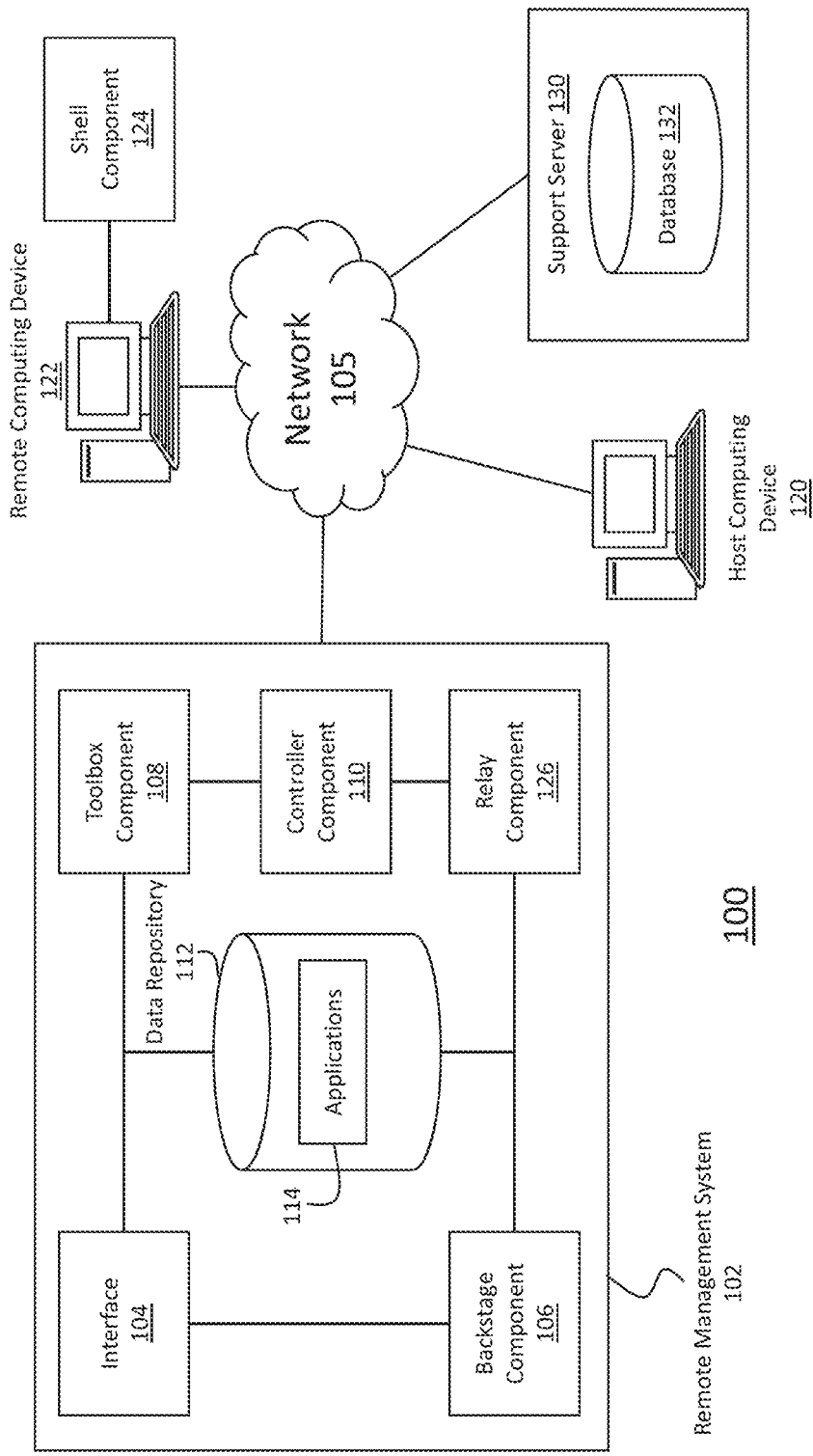
FIG. 1A is an illustrative block diagram of an example embodiment of a system for remote perspective and control of information technology infrastructure.

Many companies outsource their information technology (IT) services to outside IT service providers. Such an approach can be more economical for the companies because the companies may not have enough ongoing need to support a full time IT support technician. The IT service provider can share the time of one technician across multiple companies and efficiently provide service to a number of smaller companies in this way. In addition, with economies of scale, an IT service provider can afford to hire technicians with expertise in specific areas and be more efficient in providing service in those areas. IT service providers often use software tools to help manage their own support business, and the tools can help to automate the monitoring, service, and configuration of their customers.

Technical solutions of the present disclosure can provide a web application having an interface with a command tab. The command tab can allow hosts to run commands against their guest computing devices from the web application. To provide greater interaction with the command prompt, and a fully interactive shell that allows for the performance of operations without disturbing the end user, the technical solution of the present disclosure provides a hidden desktop or backstage feature.

For example, a backstage component executing on one or more of the remote computing device, host computing device, or cloud server, can be configured to generate, create, initiate, launch or spawn a hidden or virtual desktop operating in the system session of an end user's computing device. In some embodiments, such a hidden desktop may be referred to as a hidden desktop session. The backstage component can spawn the hidden desktop session responsive to when a host computing device (e.g., operated by a technician or administrator) connects to a remote computing device (e.g., operated by an end user). This hidden desktop session can launch a power shell, such as an automated task framework with a command line shell and a scripting language integrated into the .NET framework, which can be embedded within other applications. This hidden desktop session can also launch a command window by default. This hidden desktop session can also launch other applications, including interactive applications with a GUI. The applications, including but not limited to the power shell and command window, can allow the host computing device to access and work on the remote computing device without interrupting the end user of the remote computing device. Thus, technicians can manage, debug, and remediate issues remotely through the host client interface of the present technical solution with a full interactive power shell and command window, without interfering with or observing the work of the end user.

The backstage component can create such a hidden desktop session to which the technician can remotely connect, access, control, or otherwise manage. By connecting to the hidden desktop session, the technician's actions on the remote computing device (e.g., used by the end user) are invisible to, or hidden from, the end user. Similarly, the end user's actions on the remote computing device can be invisible to, or hidden from, the technician. As such, while the end user is using a remote computing device that is required to be re-configured or served, normal operations of the remote computing device (e.g., actions of the end user) will not be affected or interrupted. Further, the end user's actions on the remote computing device, which may include certain confidential or private information, will not be subjected to be exposed.

According to some embodiments, the backstage component can select a specific existing logon system session (e.g., session 0) that is provided for system services. The backstage component can create a hidden "desktop" on this selected session so that applications launched on this session will be able to display their user interface. The backstage component can use a capturing technique (e.g., PrintWindow function) to render the graphics of each application and compose a desktop image by doing this for each application, lowest in z-order first.

Upon establishing the hidden desktop, the system can send commands or input/output, such as the mouse input and the keyboard input.

Thus, the technical solution of the present disclosure can provide improved ability to connect to a session without using authentication or connectivity of an existing facility, such as a remote desktop protocol.

Referring now to FIG. 1A, an illustrative block diagram of an example embodiment of a system 100 for remote control in information technology infrastructure is provided. In brief overview, the system 100 can include a remote management system ("RMS") 102. The system 100 can include, access or interact with one or more of a remote computing device 122 and a host computing device 120. The system can include, access or interact with one or more of a support server 130. The components or functions of the system 100 (e.g., 102, 120, 122, and 130) may communicate with one another via one or more networks 105. The system 100 can include one or more component or function depicted in FIGS. 3A-3D.

The remote management system 102 can be executed by one or more servers (e.g., server 306a), a cloud 308, or one or more processors (e.g., main processor 321). The RMS 102 can include a host client interface, or interface 104 designed and constructed to communicate with one or more of the remote computing device 122, the host computing device 120, and the support server 130. The host client interface 104 can include a port, networking protocol, or application programming interface. The host client interface 104 can include or provide a graphical user interface.

The remote computing device 122 can include, for example, a desktop, laptop, tablet computing, smartwatch, wearable device, augmented reality device, or virtual reality device. The remote computing device 122 can include a telecommunications device. The remote computing device 122 can include input devices such as a keyboard, touchpad, mouse, pointing device, joystick or voice input interface. The remote computing device 122 can include a virtual machine that is executed on a server, or a virtual machine executed in a cloud service or cloud computing environment.

In some embodiments, the remote computing device 122 can include a shell component 124. The shell component 124 can be executed on the remote computing device 122. An operating system of the remote computing device 122 can provide logon sessions for running applications, a facility for creating and remotely connecting to a new interactive logon session, such as a remote desktop protocol, or an existing logon session but with no interactive desktop.

The shell component 124 can, for example, facilitate setting up an interactive desktop for use with a logon session. The shell component 124 can start, initiate, identify, commandeer or otherwise establish an interactive application with a graphical user interface in that interactive desktop. This interactive desktop can include a power shell and a command prompt as applications within the interactive application. The shell component 124 can render application output and capture application output. The shell component 124 can communicate with the RMS 102 and host computing device 120 (e.g., either directly or via a relay component 126) to provide captured application output, for example, for display on the host computing device 120.

The shell component 124 can provide interactive input to the interactive desktop, such as mouse and keyboard input, or communicate with RMS 102 and host computing device 120 to receive interactive input commands, for example, to allow RMS 102 to control one or more applications provided by the interactive desktop.

The host computing device 120 can include, for example, a desktop, laptop, tablet, smartwatch, wearable device, augmented reality device, or virtual reality device. The host computing device 120 can include a telecommunications device. The host computing device 120 can include input devices such as a keyboard, touchpad, mouse, pointing device, joystick or voice input interface. The host computing device 120 can include a virtual machine that is executed on a server, or a virtual machine executed in a cloud service or cloud computing environment. The host computing device 120 can use a browser configured with a real time streaming protocol to connect, interface or otherwise communicate with the remote computing device 122 or RMS 102.

The remote computing device 122 can be local to an entity, organization, office or location that includes information technology infrastructure that receives support from an agent or support technician that uses the host computing device 120. The remote computing device 122 can capture images of hardware or software that is being supported or managed by the host computing device 120.

The support server 130 can include, interface with or otherwise communicate with a database 132 to retrieve a list of support tickets. A support ticket can refer to a ticket data structure that includes information that can facilitate resolving a technical problem associated with hardware or software component at a location of the remote computing device 122. Each support ticket can have an identifier and an association to a computing device. For example, in the illustrated embodiment of FIG. 1A, a first support ticket is associated with the remote computing device 122, and a second support ticket is associated with the remote computing device 122 or another remote computing device (not shown). The remote computing devices (e.g., 122) can communicate with the support server 130 to create, generate, or otherwise initiate respective support tickets, responsive to determining that the remote computing devices may need to be reconfigured, maintained, repaired, updated or served. Upon the support tickets being generated, the support server 130 can retrieve or obtain the statuses of the support tickets based on various respective factors (e.g., a timestamp regarding when a support ticket is generated), and store or otherwise manage the statuses in the database 132.

The RMS 102 can include, interface with or otherwise communicate with at least one host client interface 104, at least one backstage component 106, at least one toolbox component 108, at least one controller component 110, at least one relay component 126, and at least one data repository 112. The data repository 112 can include one or more data structures, data bases, or data files, such as applications 114. Applications 114 can refer to or include toolbox elements, such as applications that can be provided for execution via the hidden desktop session. Applications 114 can include, for example, a web browser, command prompt, file explorer, etc.

The host client interface 104, backstage component 106, toolbox component 108, controller component 110, or relay component 126 can each include at least one processing unit or other logic device such as programmable logic array engine, or module configured to communicate with the database repository 112. The host client interface 104, backstage component 106, toolbox component 108, controller component 110 and data repository 112 can be separate components, a single component, or part of the RMS 102. The system 100 and its components, such as a RMS 102, can include hardware elements, such as one or more processors, logic devices, or circuits.

The host client interface 104 can include any type of interface configured to facilitate communication between one or more component, system or device of system 100. The host client interface 104 can be configured to facilitate communication or interaction between components or elements of the RMS 102. The host client interface 104 can present, display or otherwise provide a graphical user interface or other user interface to facilitate user interaction with the RMS 102.

The host client interface 104 can include, communicate with or execute one or more application programming interfaces ("APIs"). The APIs can be configured to interact or interface with a remote computing device 122 or a host computing device 120. The host client interface 104 can include or utilize one or more cloud application programming interfaces. The interface can include or be based on, for example, a cloud API, Open Cloud Computing Interface ("OCCI"), or representation state transfer ("REST"). Responses and requests can be received or transmitted via the interface 104 using one or more protocols or languages, such as, e.g., XML, HTML, JSON, HTTP, or SSL. Responses and requests can be received or transmitted via the host client interface 104 using one or more protocols or languages, such as, e.g., XML, HTML, JSON, HTTP, or SSL.

The RMS 102 can be intermediary to the remote computing device 122 and the host computing device 120. In some cases, the remote computing device 122 can interact with the host computing device 120 directly. The relay component 126 of the RMS 102 can facilitate establishing a connection coupling the host computing device 120 to the remote computing device 122 either directly or through the relay component 126.

In some cases, the RMS 102 can establish a secure connection or session with the host computing device 120 and the remote computing device 122 using credentials, tokens or identifiers. The RMS 102 can undergo a handshaking process with the remote computing device 122 or host computing device 120 to establish the secure connection. During a secure connection, the RMS 102 may not need to re-authenticate for each transmission.

For example, using the relay component 126, the RMS 102 can establish a connection between remote computing device 122 and host computing device 120 using a proprietary protocol. Examples of the proprietary protocol includes at least one of: a transmission control protocol (TCP), a virtual network computing (VNC) protocol, a remote desktop protocol (RDP), or the like. The relay component 126 can establish the connection directly between remote computing device 122 and host computing device 120. The relay component 126 can establish or open a first connection from the remote computing device 122 to the relay component 126 of RMS 102, and a second connection from the host computing device 120 to the relay component 126, and the relay component 126 can manage, control, monitor, or otherwise facilitate communications between the remote computing device 122 and the host computing device 120.

The host client interface 104 can establish a communication channel with the remote computing device 122 and the host computing device 120. The host client interface 104 can include or utilize a real-time streaming protocol (RTSP), real-time transport protocol (RTP) or a real-time transport control protocol (RTCP) to stream media over network 105. RTSP can run over a variety of transport protocols, while RTP and RTCP can run over the user datagram protocol (UDP). The host client interface 104 or interface 128 can be configured with one or more of the RTSP, RTP or RTCP protocols. The host client interface 104 or interface 128 can use a video coding format, such as H.264, HEVC, VP8 or VP9.

The backstage component 106 can utilize the interface 104 to communicate with the support server 130 to select, pinpoint, or otherwise identify a remote computing device (e.g., 122) according to a support ticket associated with the remote computing device 122. For example, in response to the remote computing device 122, generating a first support ticket in the database 132, the backstage component 106 can receive the first support ticket from the database 132. In response to the remote computing device 122, or another remote computing device, later generating a second support ticket in the database 132, the backstage component 106 can also receive the second support ticket from the database 132. In response to the reception of the support tickets, the backstage component 106 can determine the priorities of the first and second support tickets based on the respective statuses such as, for example, the timestamps regarding when the first and second support tickets were generated. As such, the backstage component 106 can identify a remote computing device that has a highest priority to be served. Continuing with the above example, the backstage component 106 may determine the priority of the first support ticket to be higher than the priority of the second support ticket in response to identifying that the timestamp of the first support ticket is earlier than the timestamp of the second support ticket. In another example, the backstage component 106 may determine the priority of the first support ticket to be higher than the priority of the second support ticket in response to identifying that the remote computing device 122 that generates the first support ticket has a privilege, according to an organization policy, over the remote computing device 122 that generates the second support ticket.

In response to identifying the remote computing device 122, the backstage component 106 can cause the host client interface 104 or relay component 126 to establish one or more connections communicatively coupled the identified remote computing device to a host computing device. For example, the RMS 102 can use the host client interface 104 or relay component 126 to establish a connection between the remote computing device 122 and host computing device 120 using a proprietary protocol. The RMS 102 can establish the connection directly between the remote computing device 122 and host computing device 120. The RMS 102 can establish or open a first connection from the remote computing device 122 to the relay component 126 of the RMS 102, and a second connection from the host computing device 120 to the relay component 126, and the relay component 126 can manage, control, monitor, or otherwise facilitate communications between the remote computing device 122 and the host computing device 120.

In response to establishing the connection between the identified remote computing device 122 and host computing device 120, the backstage component 106 can hijack, commandeer, overtake or otherwise utilize a system session executed on the remote computing device 122 via the connection. For example, the backstage component 106 can select a specific existing logon system session (e.g., session 0) executed on the remote computing device 122 that is provided for system services. The backstage component 106 can communicate with the shell component 124 executing on the remote computing device 122 to hijack, commandeer, overtake or otherwise utilize the system session of the remote computing device 122. In some embodiments, the system session can provide a separate windows station that is initially marked as non-interactive and used for windows services. By hijacking such a system session, the backstage component 106 can perform various actions on the hijacked system session (e.g., create a graphical environment on session 0, transmit the graphical environment to the host computing device 120, etc., which shall be discussed below) without interrupting an end user of the remote computing device 122.

In response to hijacking the system session of the remote computing device 122, the backstage component 106 can transition or change the system session from a non-interactive state to an interactive state. The backstage component 106 may add a registry key to a registry of the remote computing device 122 to cause the hijacked system session to transition from the non-interactive state to the interactive state. For example, computer software executed on the remote computing device 122, such as operation systems and applications, may use configuration data to control the start-up and operational behavior of the software. Such configuration data is stored in a data structure known as the WINDOWS® registry. The registry is a data structure that contains information and settings for all the hardware and operating system software, as well as information and settings for most non-operating system software, users, preferences of the computing device, etc. In addition to reading information from a registry, the backstage component can modify the registry by adding new registry key(s) and/or value(s), modifying existing registry key(s) and/or value(s), and deleting registry key(s) and/or value(s). In some embodiments, the backstage component 106 may transition the hijacked system session from the non-interactive state to an interactive state by adding a new registry key to the registry of the remote computing device 122, and subsequently transition the system session back to the non-interactive state by deleting the registry key, which shall be discussed below.

In response to transitioning the hijacked system session to the interactive state, the backstage component 106 can generate, create, initiate, launch or spawn a virtual or hidden desktop within the hijacked system session to be displayed on a display device of the host computing device (e.g., 120). In some embodiments, the backstage component 106 may communicate with the shell component 124 executing on the remote computing device 122 to compose one or more windows stations within the hijacked system session to generate the hidden desktop. For example, the backstage component 106 may cause the shell component 124 to create a graphical environment on the hijacked system session, and transmit the graphical environment to the RMS 102 or host computing device 120. The shell component 124 can transmit the graphical environment using a proprietary communication protocol. The backstage component 106 may cause the shell component 124 to create a desktop and a windows station on the hijacked system session by capturing each window (e.g., PrintWindow function), performing a desktop composition for each window, and maintaining z-order for each window. The backstage component 106 can cause the shell component 124 to intercept all session calls. The shell component 124 can include or interface with a desktop composition manager that is managed by a graphics card of the remote computing device 122.

Such a hidden desktop may sometimes be referred to as a hidden desktop session. This hidden desktop session can include, launch, or initiate an interactive power shell, such as an automated task framework with a command line shell and a scripting language integrated into the NET framework, which can be embedded within other applications. This hidden desktop session can also include, launch, or initiate an interactive command window by default. This hidden desktop session can also include, launch, or initiate other applications, including interactive applications with a GUI. The applications, including the power shell and command window, can allow the host machine to access and work on the remote machine without interrupting the end user of the remote machine. Thus, technicians can manage, debug, and remediate issues remotely through the host client interface of the present technical solution with a full interactive power shell and command window, without interfering with or observing the work of the end user.

In response to the backstage component 106 generating the hidden desktop (session), the backstage component 106 may communicate with the toolbox component 108 to provide one or more toolboxes. The one or more toolboxes may be provided over the hidden desktop. Examples of such toolboxes can include at least one of: small scripts, single line executables, simple text, or img files. In some embodiments, the toolbox component 108 can include or provide the toolboxes to launch one or more web applications running in the hijacked system session. In some embodiments, the web application may be interactive over the hidden desktop. Examples of such web application can include at least one of: browsers, text editors, or low GUI applications.

In response to the backstage component 106 generating the hidden desktop (session), the backstage component 106 may communicate with the controller component 110 to receive, obtain, or otherwise identify one or more instructions inputted through the hidden desktop by the host computing device 120 to update a configuration of the remote computing device 122 in a hidden manner. The controller component 110 can identify one or more instructions from the host computing device 120 and process the instructions. For example, the controller component 110 can identify the instruction inputted through the hidden desktop by one or more input devices (e.g., a mouse, a keyboard, etc.) communicatively coupled to the host computing device 120, and process the instruction. The controller component 110 can convert the identified instruction into a command to provide to the remote computing device 122 for updating the configuration of the remote computing device 122. The controller component 110 can overlay or embed the command in the communication channel established between the remote computing device 122 and the interface 104. The controller component 110 can open or establish or utilize a different communication channel to transmit commands to the remote computing device 122.

The controller component 110 can receive instructions from the remote computing device 122 and use one or more policies or instructions to determine a type of command to generate and transmit to the remote computing device 122.

In some cases, the controller component 110 can include, access or utilize a remote monitoring and management (RMM) system to implement the instruction via an agent executing on the remote computing device 122. The RMM can take control of a device identified in the video stream. For example, the controller component 110 can map an identifier or characteristic of the device to the device identifier, and provide the device identifier to the RMM. The RMM can, via the network 105, connect with the device or manage the device. The RMM can update the device in the video stream, or push a configuration to the device in the video stream.

In response to receiving the instructions, the backstage component 106 may cause the shell component 124 to execute, in a hidden manner, the instructions within the hijacked system session to update the configuration of the remote computing device 122. Simultaneously with or subsequently to executing, in a hidden manner, the instructions on the remote computing device 122, the backstage component 106 may receive a command from the host computing device 120. In response to the reception of the command, the backstage component 106 may transition the hijacked system session from the interactive state back to the non-interactive state to terminate the hijacked system session. In some embodiments, the backstage component 106 may transition the hijacked system session from the interactive state to the non-interactive state by deleting a registry key (e.g., the previously added registry key) from the registry of the remote computing device 122.

Further, the backstage component 106 can monitor, detect, or otherwise manage whether the instructions have been executed on the remote computing device 122. The backstage component 106 may close the support ticket associated with the remote computing device 122 in response to detecting that the instructions have been executed on the remote computing device 122 and/or receiving the command to terminate the hijacked system session from the host computing device 120. Upon closing the support ticket, the backstage component 106 may communicate with support server 130 to update the status of the support ticket in the database 132.

FIGS. 1B, 1C, 1D, 1E, 1F, and 1G are illustrative operations or graphical user interfaces provided by the system 100 depicted in FIG. 1A. In some embodiments, each of FIGS. 1B-1G may be associated with an operation that the system 100 (e.g., RMS 102) performs in response to the input of a user (e.g., the selection of a technician). The illustrated embodiments of the operations of FIGS. 1B-1G are merely an example. Therefore, it should be understood that any of one or more operations may be omitted, re-sequenced, and/or added while remaining within the scope of the present disclosure.

In FIG. 1B, the RMS 102 provides a user interface 140 including an access screen to allow selection of a remote computing device (e.g., remote computing devices 144, 146, and 148) from a list of remote computing device 142. In some embodiments, the RMS 102 may communicate with the support server 130 to retrieve the list of remote computing device 142. The list 142 may include one or more remote computing devices that have each generated one or more support lists in the database 132. The RMS 102 may organize, arrange, compile, or otherwise manage a sequence of the remote computing devices on the list 142 based on respective priorities. For example, the RMS 102 may determine that the remote computing device 122 is associated with a support ticket that has a highest priority; the remote computing device 146 is associated with a support ticket that has a medium priority; and the remote computing device 148 is associated with a support ticket that has a lowest priority. Accordingly, the RMS 102 can organize the remote computing devices 122, 146, and 148 to be on the top, in the middle, and the bottom of the list 142, respectively, as shown in FIG. 1B.

Figure 1C:
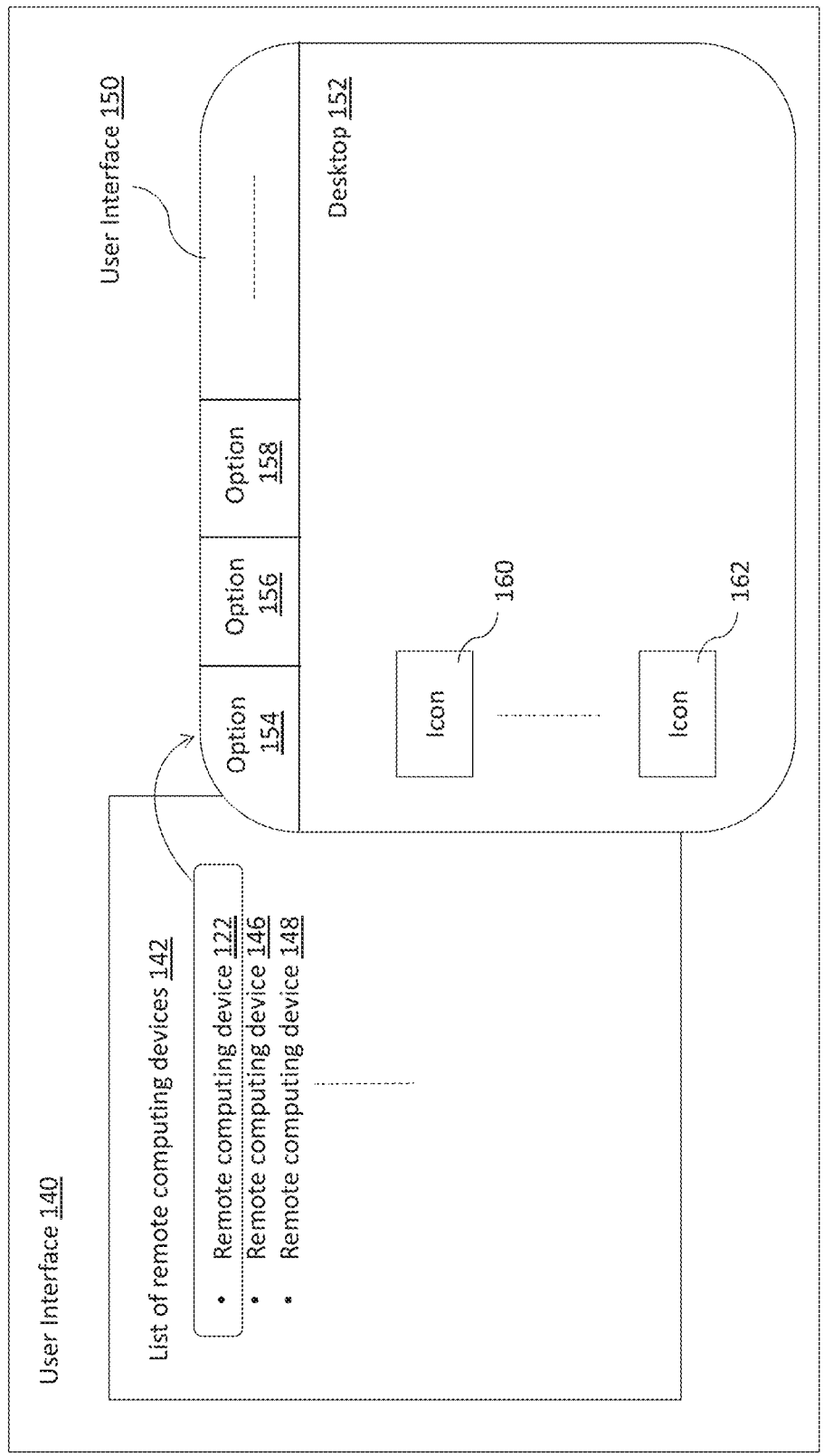

FIG. 1C depicts the RMS 102 selecting one of the remote computing devices (e.g., 122 in the illustrated embodiment of FIG. 1C) and accessing the remote computing device 122. In response to selecting the remote computing device 122 (or identifying the remote computing device 122 being selected), the RMS 102 may provide a user interface 150. The user interface 150 may present, display or otherwise include a desktop 152 of the remote computing device 122, which can include one or more icons 160 and 162. The desktop 152 may reside within a session different from a system session of the remote computing device 122, which allows the icons 160-162 to be interactive. In some embodiments, the user interface 150 may include a number of options 154, 156, and 158, each of which may be configured to provide further functions (e.g., launch one or more additional user interfaces, establish a hidden desktop, etc.).

Figure 1D:
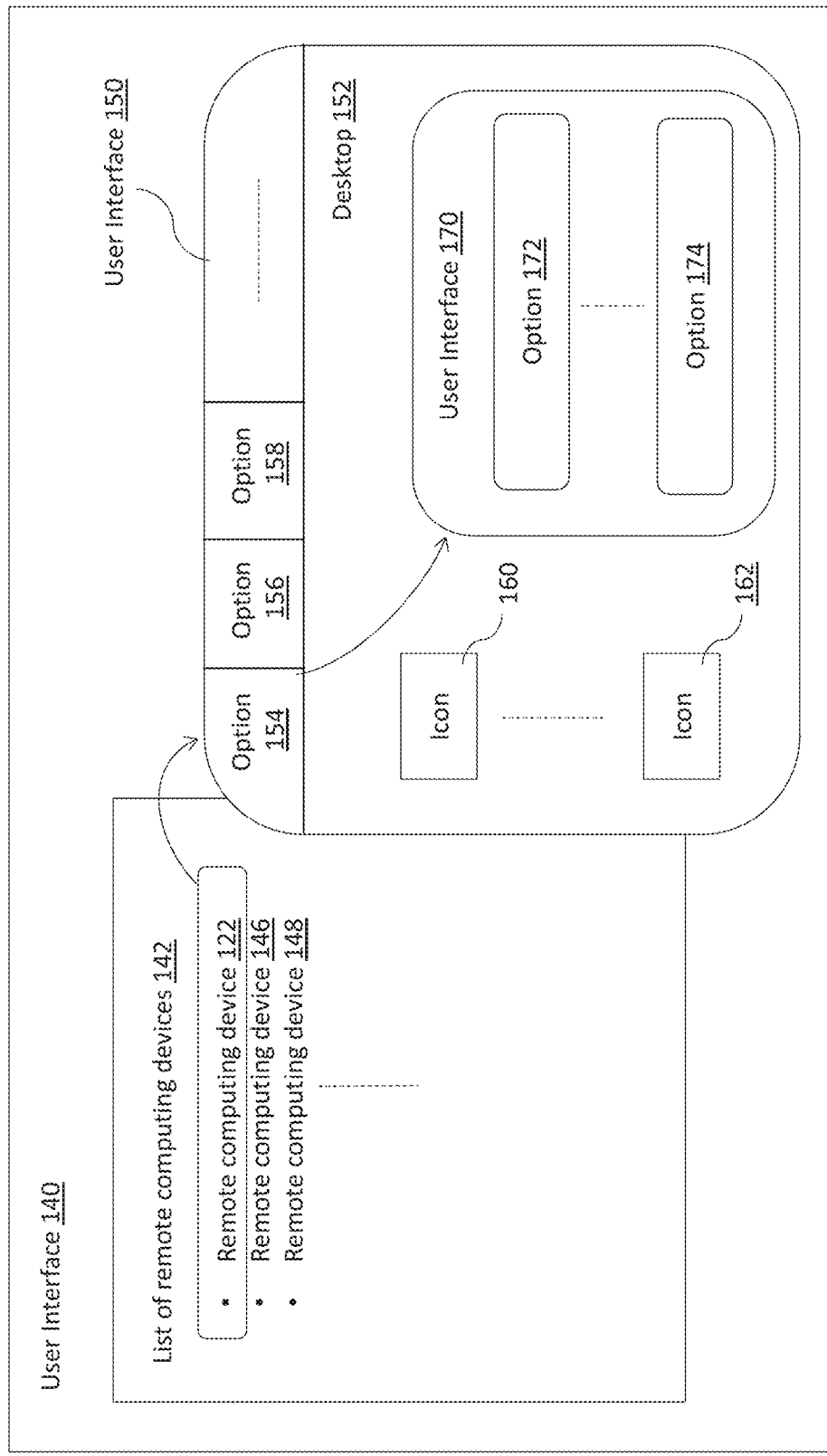

FIG. 1D depicts the RMS 102 opening a user interface 170 to initiate establishing a hidden desktop. The RMS 102 can open, present, or provide the user interface 170 in response to detecting one or more of the options 154, 156, and 158 being selected. For example, in response to detecting that the option 154 is selected, the RMS 102 may provide the user interface 170. The user interface 170 can include one or more options 172 and 174, wherein at least one of the options 172 and 174 may represent a selectable button regarding whether to establish a hidden desktop for the remote computing device 122.

Figure 1E:
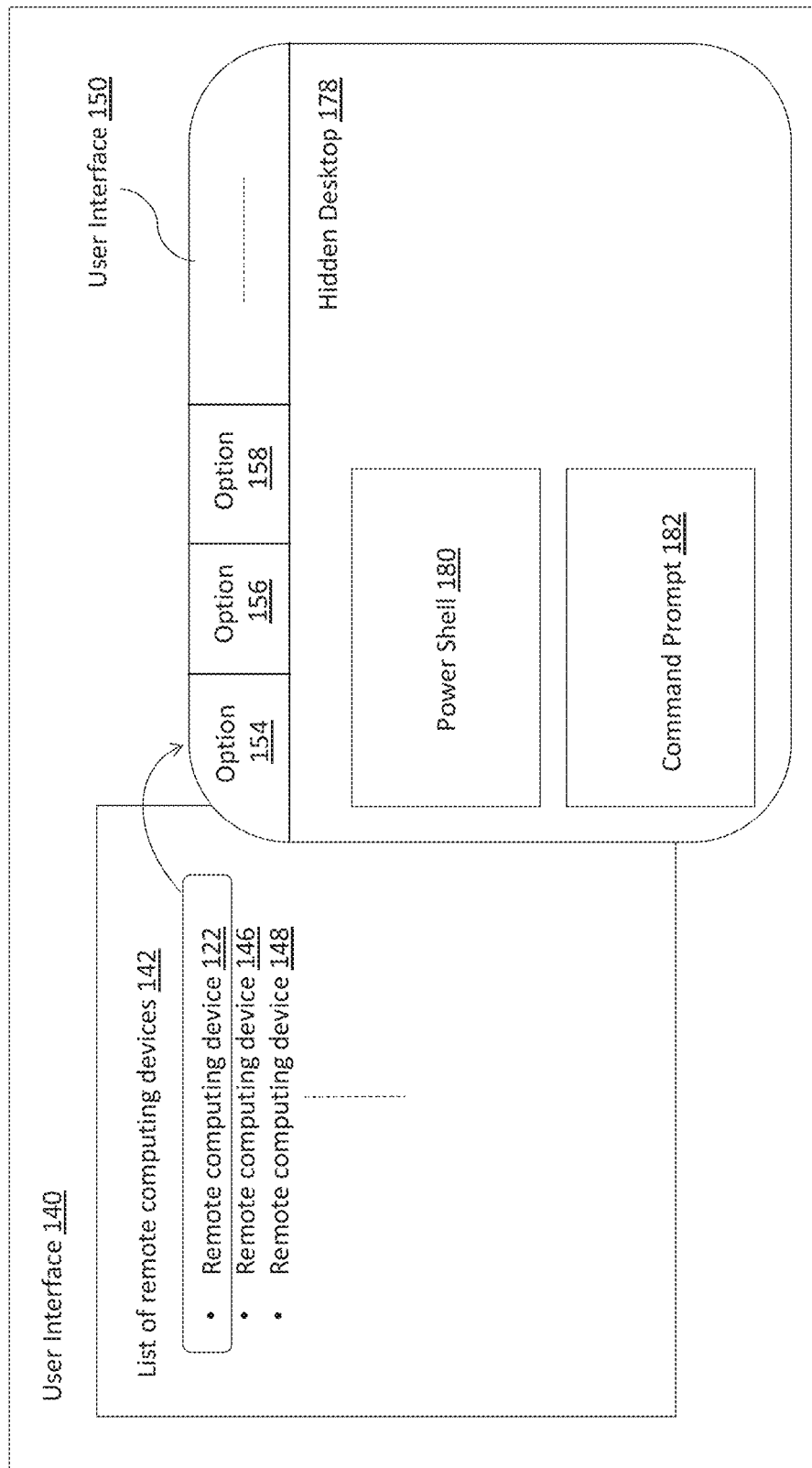

In response to detecting that the option 174 is selected (e.g., to establish a hidden desktop), FIG. 1E depicts the RMS 102 initiating a hidden desktop 178. As discussed above, the RMS 102 may establish the hidden desktop 178 by hijacking a system session of the remote computing device 122, transitioning the hijacked system session from a non-interactive state to an interactive state, and/or composing one or more windows stations within the hijacked system session to provide the hidden desktop 178. In response to establishing the hidden desktop 178, the RMS 102 can spawn interactive windows, such as a power shell 180 and command prompt 182, with the hidden desktop 178.

Figure 1F:
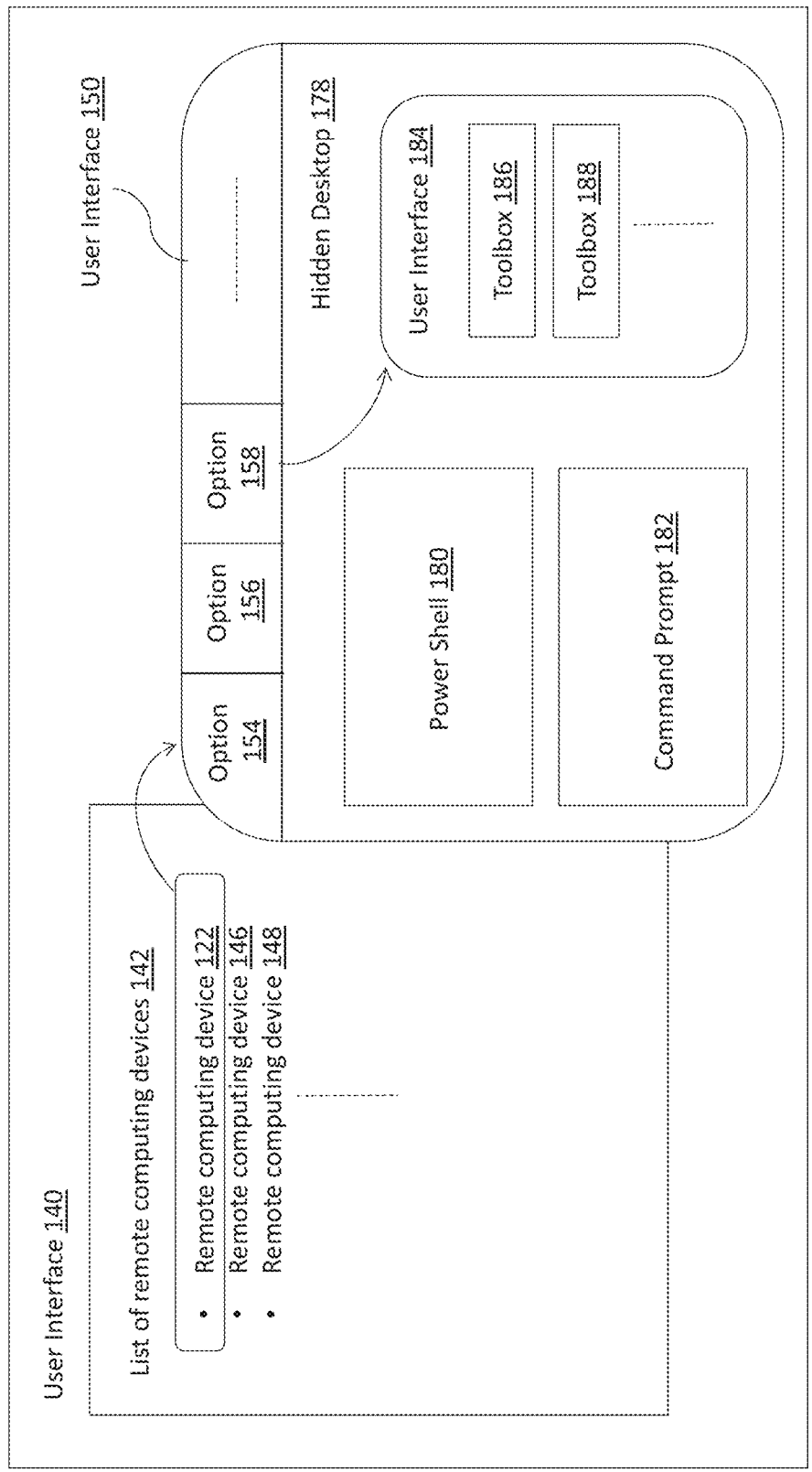
Figure 1G:
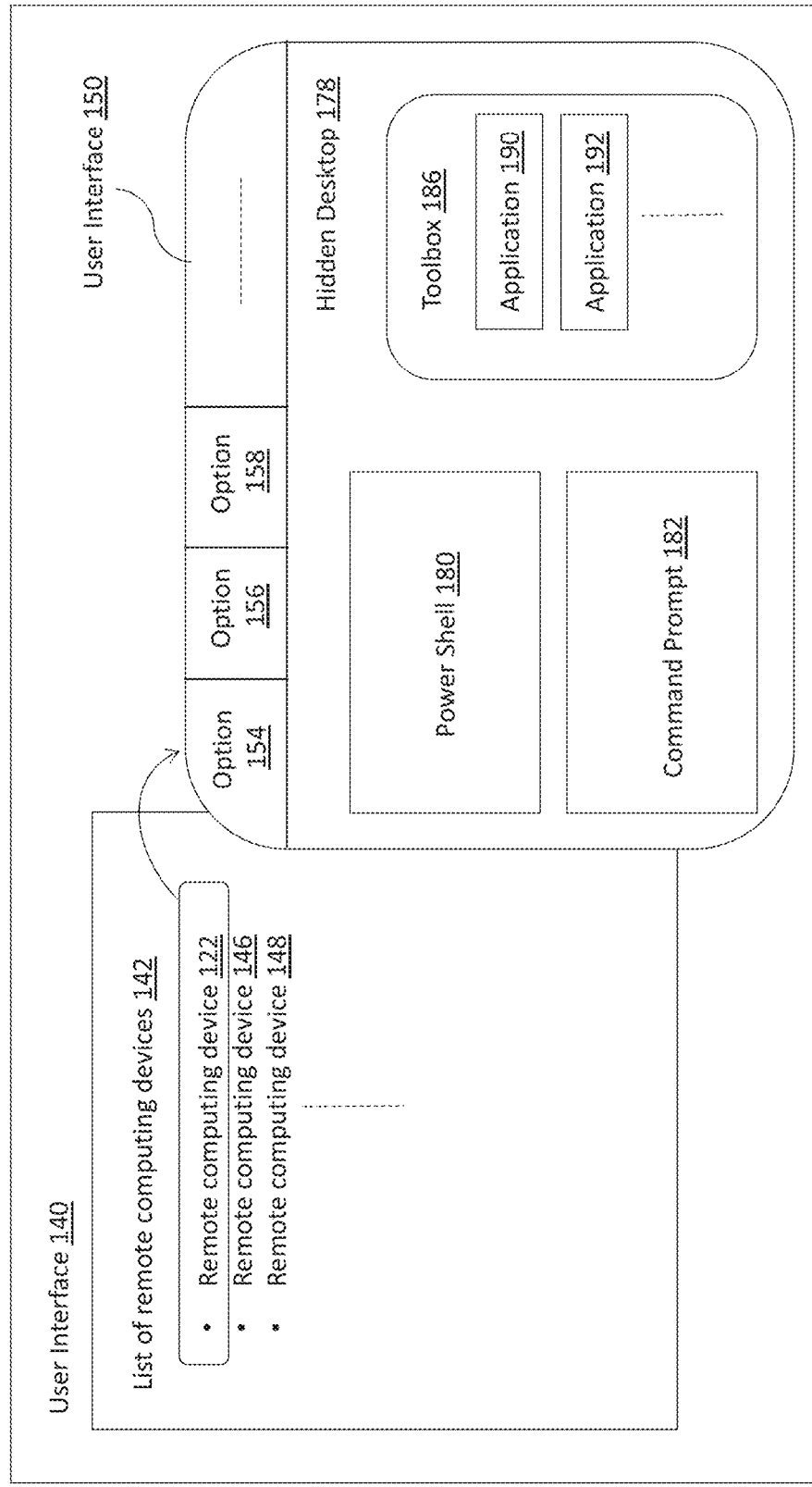

FIG. 1F depicts the RMS 102 providing a user interface 184 in response to detecting that the option 158 is selected. While providing the hidden desktop 178, the RMS 102 may allow one or more of the options 154, 156, and 158 to remain selectable. In the illustrated embodiment of FIG. 1F, the option 158 may represent a selectable button to launch the user interface 184 that has a number of selectable toolboxes. The user interface 184 can include a list of toolboxes 186 and 188 to be selected to each launch an application. FIG. 1G depicts the RMS 102 providing access to the applications 190 and 192 provided by the selected toolbox 186.

Figure 2A:
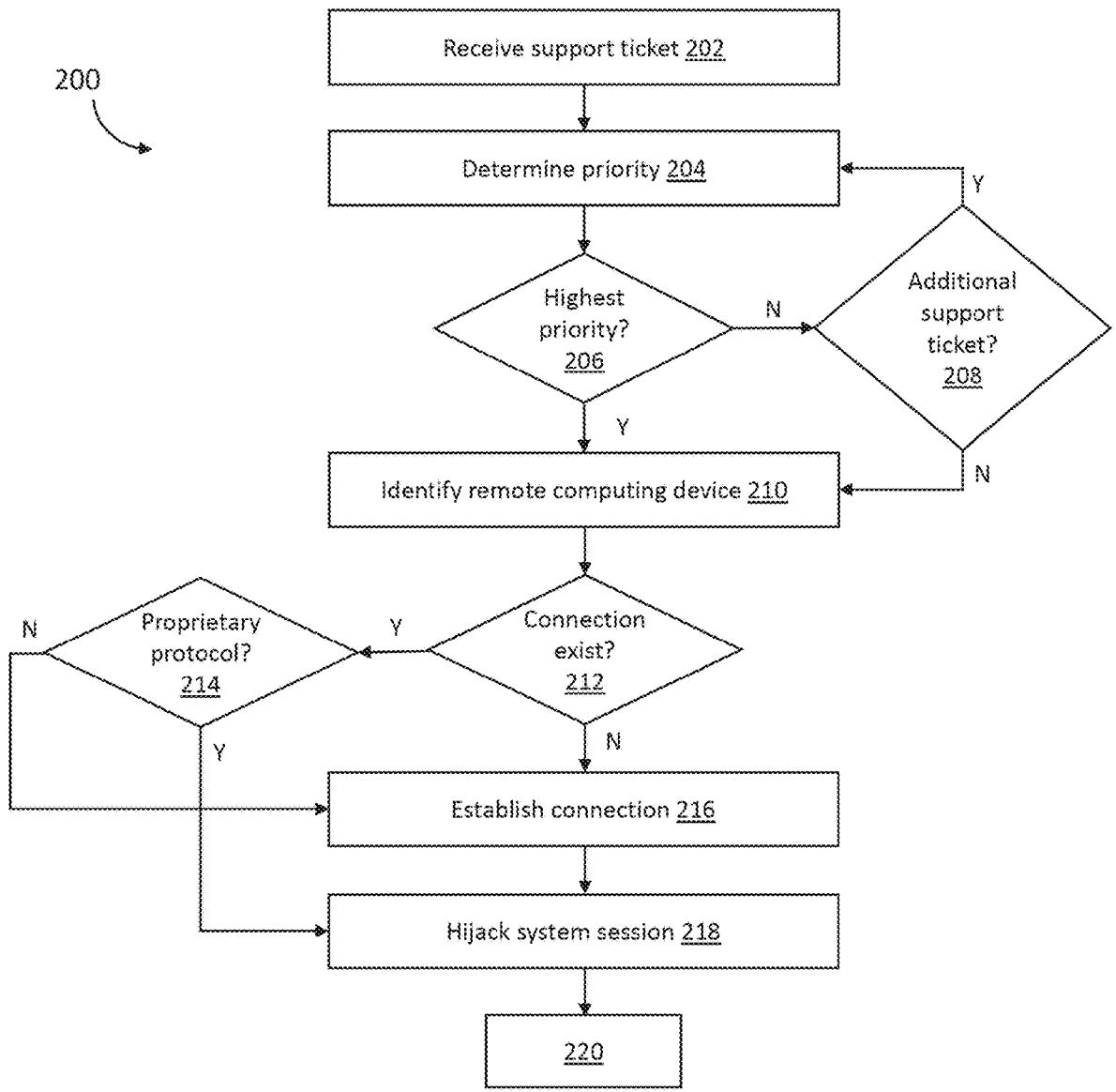
FIGS. 2A-2B are illustrative flow diagrams of an example embodiment of a method for remote perspective and control of information technology infrastructure.
Figure 2B:
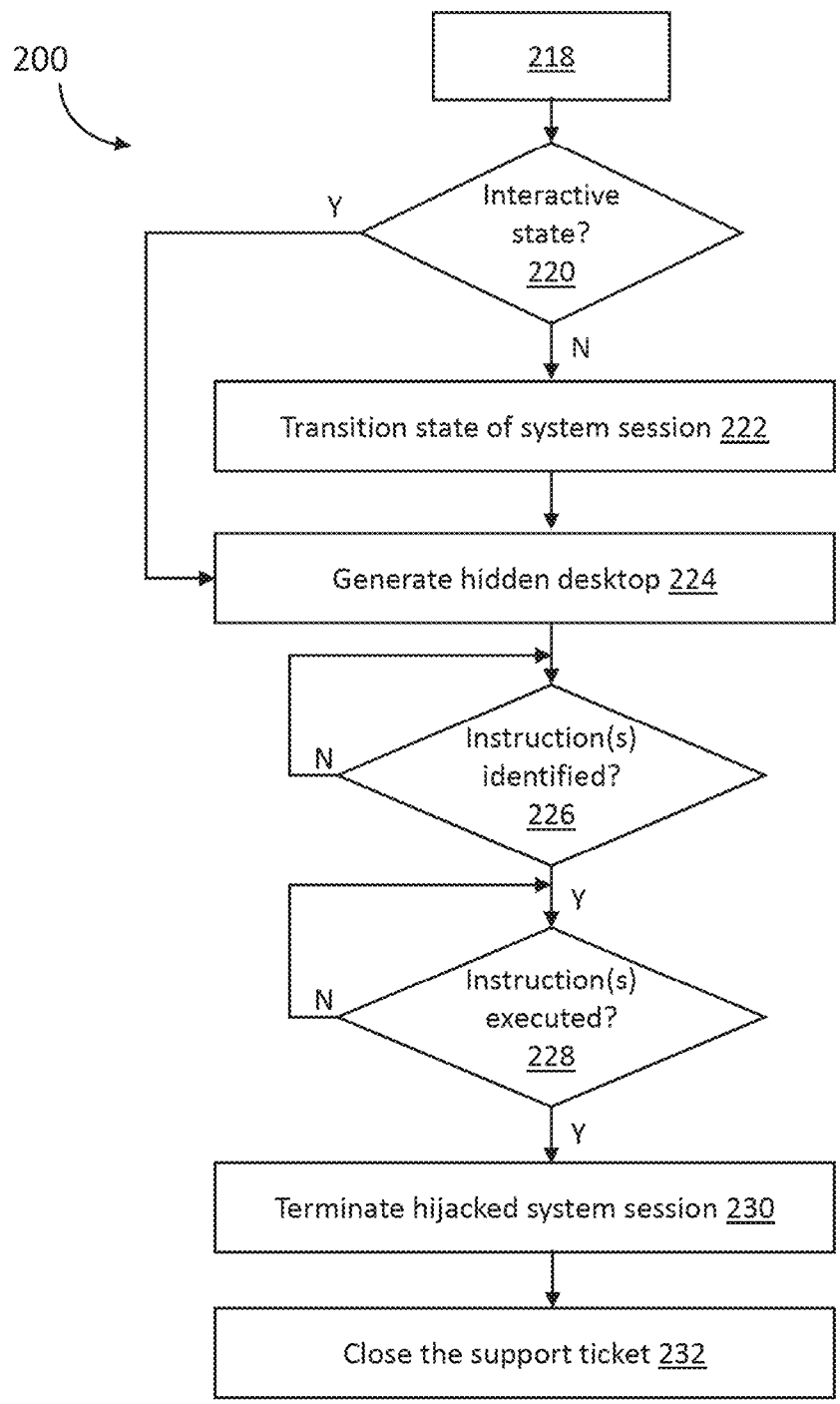

Referring to FIGS. 2A and 2B, depicted is a flow diagram of one embodiment of a method 200 for remotely managing computing devices. The method 200 for remotely managing computing devices can be based on hijacking the system session of a remote computing device, transitioning the hijacked system session from a non-interactive state to an interactive state, and/or composing one or more windows stations within the hijacked system session to provide a hidden desktop. The functionalities or operations of the method 200 may be implemented using, or performed by the components detailed herein in connection with FIGS. 1A-1G.

In brief overview, a remote management system (RMS) can receive a support ticket at operation 202. The RMS can determine a priority of the support ticket at operation 204. Next, at operation 206, the RMS can determine whether the priority is the highest. If not, the RMS can determine whether there is an additional support ticket at operation 208. If so, the RMS can identify a remote computing device associated with the support ticket. At operation 208, if there is an additional support ticket, the method 200 may proceed again to operation 204; and on the other hand, if not, the method 200 may proceed to operation 210. At operation 212, the RMS may determine whether a connection exists. If so, the RMS may further determine whether the connection is under a proprietary protocol at operation 214. If not, the RMS may establish a connection at operation 216. At operation 214, if the existing connection is not under a proprietary protocol, the method 200 may proceed to operation 216; and on the other hand, if the existing connection is under a proprietary protocol, the method 200 may proceed to operation 218. At operation 218, the RMS can hijack a system session of the identified remote computing device. Next, at operation 220, the RMS can determine whether the system session is in an interactive state. If not, the RMS can transition the system session to an interactive state at operation 222, and generate a hidden desktop at operation 224. If so (e.g., the system session has been in the interactive state), the method 200 may proceed directly to operation 224. At operation 226, the RMS can determine whether one or more instruction have been identified. If not, the RMS may continue identifying at least one instruction (e.g., performing again operation 226); and on the other hand, if so, the RMS can detect whether the one or more instructions have been executed at operation 228. If not, the RMS may continue detecting whether the one or more instructions have been executed (e.g., performing again operation 228); and on the other hand, if so, the RMS can terminate the hijacked system session at operation 230. Next, the RMS can close the support ticket at operation 232.

Referring to operation 202, the RMS (e.g., RMS 102) can receive a support ticket. In some embodiments, the RMS 102 can communicate with a support server (e.g., support server 130) to receive a support ticket. A remote computing device (e.g., remote computing device 122) may initiate the generation of such a support ticket based on determining that the remote computing device needs to be re-configured, maintained, repaired, or updated. In response to the determination, the remote computing device may communicate with the support server to generate a support ticket.

While generating the support ticket, the support server may associate the support ticket with a timestamp, which can be when the remote computing device initiate generating the support ticket and/or when the support server generates the support ticket, and an identifier of the particular remote computing device. As such, the support server can manage a number of support tickets, each of which may be associated with an identical or different remote computing device and timestamp. For example, a remote computing device may communicate with the support server to generate multiple support tickets at respective different times. In another example, a first remote computing device may communicate with the support server to generate a first support ticket and a second remote computing device may communicate with the support server to generate a second support ticket at about the same time. By associating each of the support tickets with a respective device identifier and a respective timestamp, the support server may manage respective statuses of the support tickets.

Referring to operation 204, the RMS can determine a priority of the received support ticket. The RMS may communicate with the support server to retrieve a status of the support ticket, which may include information regarding a timestamp and/or an identifier of the remote computing device (e.g., 122). The RMS can determine a priority of the support ticket based on the status. For example, the RMS may determine whether a difference between the timestamp and a current time is less than a predefined threshold. If so, the RMS may determine the priority to be high; and if not, the RMS may determine the priority to be low. In another example, the RMS may determine whether a difference between the timestamp and a current time is less than a first predefined threshold. If so, the RMS may determine the priority to be high; and if not, the RMS may further determine whether the difference is less than a second predefined threshold. If so, the RMS may determine the priority to be medium; and if not, the RMS may determine the priority to be low.

At operation 206, the RMS can determine whether the priority of the support ticket is the highest. In some cases, the RMS may receive one or more support tickets, each of which may be associated with a respective priority. The RMS may identify the remote computing device (e.g., remote computing device 122) based on determining that an associated support ticket has the highest priority, which leads the method 200 to operation 210. Referring again to operation 206, in response to determining that the support ticket does not have the highest priority (e.g., a medium or low priority), the RMS can determine whether one or more additional support tickets have been received. If so (e.g., one or more other support tickets from the remote computing device 122, one or more support tickets from a remote computing device different than the remote computing device 122), the RMS can identify a remote computing device by comparing the respective priorities. On the other hand, if not (e.g., the RMS received one support ticket only from the remote computing device 122), the RMS may automatically identify the remote computing device.

In response to identifying the remote computing device, referring to operation 212, the RMS may determine whether a connection exists between the remote computing device and a host computing device (e.g., host computing device 120). If so, the RMS may further examine, detect, or otherwise determine whether the existing connection is established under a proprietary protocol (operation 214). Examples of the proprietary protocol includes at least one of: a transmission control protocol (TCP), a virtual network computing (VNC) protocol, a remote desktop protocol (RDP), or the like. On the other hand, if not (e.g., no existing connection), the RMS may establish a connection communicatively coupling the remote computing device to the host computing device under the proprietary protocol (operation 216). Referring again to operation 214, if the RMS determines that connection is not established under the proprietary protocol, the RMS may establish a new connection communicatively coupling the remote computing device to the host computing device under the proprietary protocol (operation 216). If the RMS determines that connection is established under the proprietary protocol, the RMS may hijack a system session (e.g., session 0) of the remote computing device (operation 218).

At operation 218, the RMS may communicate with a shell component executing on the remote computing device to hijack, commandeer, overtake or otherwise utilize the system session of the remote computing device. The system session can provide a separate windows station that is initially marked as non-interactive and used for windows services. By hijacking such a system session, the RMS can perform various actions on the hijacked system session (e.g., create a graphical environment on session 0, transmit the graphical environment to the host computing device) without interrupting an end user of the remote computing device.

In response to hijacking the system session of the remote computing device, the RMS may determine whether the hijacked system session is in an interactive state (operation 220). In response to determining that the system session is not in the interactive state, the RMS can transition the system session to the interactive state (operation 222). For example, the RMS may add a new registry key to a registry executing on the remote computing device to transition the system session from a non-interactive state to the interactive state. In response to transitioning the system session to the interactive state, the RMS may generate a hidden desktop within the hijacked, interactive system session (operation 224). Referring again to operation 220, if the RMS determines that the system session has been in the interactive state (e.g., which may be due to a previous transition), the RMS can directly generate a hidden desktop within the hijacked, interactive system session (operation 224).

At operation 224, the RMS generate, create, initiate, launch or spawn a virtual or hidden desktop within the hijacked system session to be displayed on a display device of the host computing device (e.g., 120). The RMS may communicate with the shell component executing on the remote computing device to compose one or more windows stations within the hijacked system session to generate the hidden desktop. For example, the backstage component 106 may cause the shell component to create a graphical environment on the hijacked system session, and transmit the graphical environment to the RMS or host computing device.

Upon the hidden desktop being generated, the RMS may determine whether one or more instructions have been identified through the hidden desktop. In some embodiments, the RMS may communicate with the host computing device to identify whether one or more instructions have been inputted through the hidden desktop displayed to the host computing device. Such instructions may be inputted as one or more commands into a power shell and/or command prompt of the hidden desktop so as to repair, modify, or update a configuration of the remote computing device. If the RMS determines that no instruction has been identified ("N" branch from operation 226), the RMS may continue identifying any instruction. On the other hand, if the RMS has identified at least one instruction inputted through the hidden desktop ("Y" branch from operation 226), the RMS may determine whether the instruction is executed on the remote computing device (operation 228).

At operation 228, the RMS may communicate with the remote computing device to determine whether the identified instructions have been executed on the remote computing device. The remote computing device may execute, in a hidden manner, the instructions in the hijacked system session, i.e., the execution of the instruction is invisible or unnoticeable to an end user of the remote computing device. If the RMS determines that the instructions have not been executed on the remote computing device ("N" branch from operation 228), the RMS may continue detecting whether the remote computing device has executed the instruction. On the other hand, if the RMS determines that the instructions have been executed on the remote computing device ("Y" branch from operation 228), the RMS may terminate the hijacked system session (operation 230).

At operation 230, the RMS may terminate the hijacked system session in response to receiving a command from the host computing device. The RMS may receive such a command through the hidden desktop. The RMS may terminate the hijacked system session by transitioning the system session from the interactive state back to the non-interactive state. The RMS may remove or delete a registry key from the registry executing on the remote computing device to transition the system session back to the non-interactive state.

Simultaneously with or subsequently to terminating the hijacked system session, at operation 232, the RMS may close the support ticket associated with the remote computing device. For example, in response to receiving the command (to terminate the hijacked system session) from the host computing device, the RMS may communicate with the support server to close the support ticket. In some embodiments, the RMS may move forward to a successive support ticket (e.g., a support ticket with the second highest priority) to hijack a system session of the corresponding remote computing device, generate a hidden desktop in the hijacked system session, and update, in a hidden manner, a configuration of the remote computing device according to one or more instructions inputted through the hidden desktop.

Figure 3A:
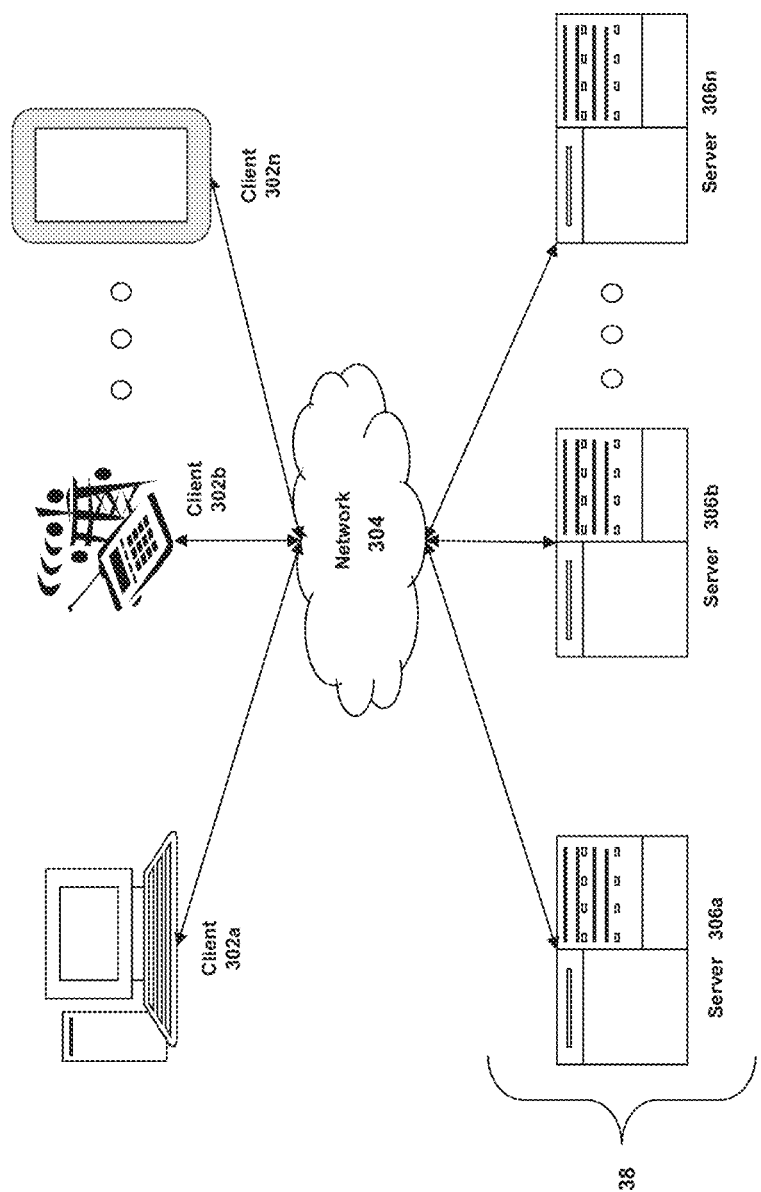
FIG. 3A is a block diagram depicting an embodiment of a network environment comprising client device in communication with server device.

Referring to FIG. 3A, an embodiment of a network environment that can be used in connection with the methods and systems described herein is depicted. In brief overview, the network environment includes one or more clients 302a-302n (also generally referred to as local machine(s) 302, client(s) 302, client node(s) 302, client machine(s) 302, client computer(s) 302, client device(s) 302, endpoint(s) 302, or endpoint node(s) 302) in communication with one or more servers 306a-306n (also generally referred to as server(s) 306, node 306, or remote machine(s) 306) via one or more networks 304. In some embodiments, a client 302 has the capacity to function as both a client node seeking access to resources provided by a server and as a server providing access to hosted resources for other clients 302a-302n.

Although FIG. 3A shows a network 304 between the clients 302 and the servers 306, the clients 302 and the servers 306 may be on the same network 304. In some embodiments, there are multiple networks 304 between the clients 302 and the servers 306. In one of these embodiments, a network 304' (not shown) may be a private network and a network 304 may be a public network. In another of these embodiments, a network 304 may be a private network and a network 304' a public network. In still another of these embodiments, networks 304 and 304' may both be private networks.

The network 304 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 304 may be any type and/or form of network. The geographical scope of the network 304 may vary widely and the network 304 can be a body area network (BAN), a personal area network (PAN), a local-area network (LAN), e.g., Intranet, a metropolitan area network (MAN), a wide area network (WAN), or the Internet. The topology of the network 304 may be of any form and may include, e.g., any of the following: point-to-point, bus, star, ring, mesh, or tree. The network 304 may be an overlay network which is virtual and sits on top of one or more layers of other networks 304'. The network 304 may be of any such network topology as known to those ordinarily skilled in the art capable of supporting the operations described herein. The network 304 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 304 may be a type of a broadcast network, a telecommunications network, a data communication network, or a computer network.

In some embodiments, the system may include multiple, logically-grouped servers 306. In one of these embodiments, the logical group of servers may be referred to as a server farm 38 or a machine farm 38. In another of these embodiments, the servers 306 may be geographically dispersed. In other embodiments, a machine farm 38 may be administered as a single entity. In still other embodiments, the machine farm 38 includes a plurality of machine farms 38. The servers 306 within each machine farm 38 can be heterogeneous-one or more of the servers 306 or machines 306 can operate according to one type of operating system platform (e.g., WINDOWS NT, manufactured by Microsoft Corp. of Redmond, Washington), while one or more of the other servers 306 can operate according to another type of operating system platform (e.g., Unix, Linux, or Mac OS X).

In one embodiment, servers 306 in the machine farm 38 may be stored in high-density rack systems, along with associated storage systems, and located in an enterprise data center. In this embodiment, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 38 do not need to be physically proximate to another server 306 in the same machine farm 38. Thus, the group of servers 306 logically grouped as a machine farm 38 may be interconnected using a wide-area network (WAN) connection or a metropolitan-area network (MAN) connection. For example, a machine farm 38 may include servers 306 physically located in different continents or different regions of a continent, country, state, city, campus, or room. Data transmission speeds between servers 306 in the machine farm 38 can be increased if the servers 306 are connected using a local-area network (LAN) connection or some form of direct connection. Additionally, a heterogeneous machine farm 38 may include one or more servers 306 operating according to a type of operating system, while one or more other servers 306 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 306 may comprise components, subsystems and modules to support one or more management services for the machine farm 38. In one of these embodiments, one or more servers 306 provide functionality for management of dynamic data, including techniques for handling failover, data replication, and increasing the robustness of the machine farm 38. Each server 306 may communicate with a persistent store and, in some embodiments, with a dynamic store.

Server 306 may be a file server, application server, web server, proxy server, appliance, network appliance, gateway, gateway server, virtualization server, deployment server, SSL VPN server, or firewall. In one embodiment, the server 306 may be referred to as a remote machine or a node. In another embodiment, a plurality of nodes 290 may be in the path between any two communicating servers.

Figure 3B:
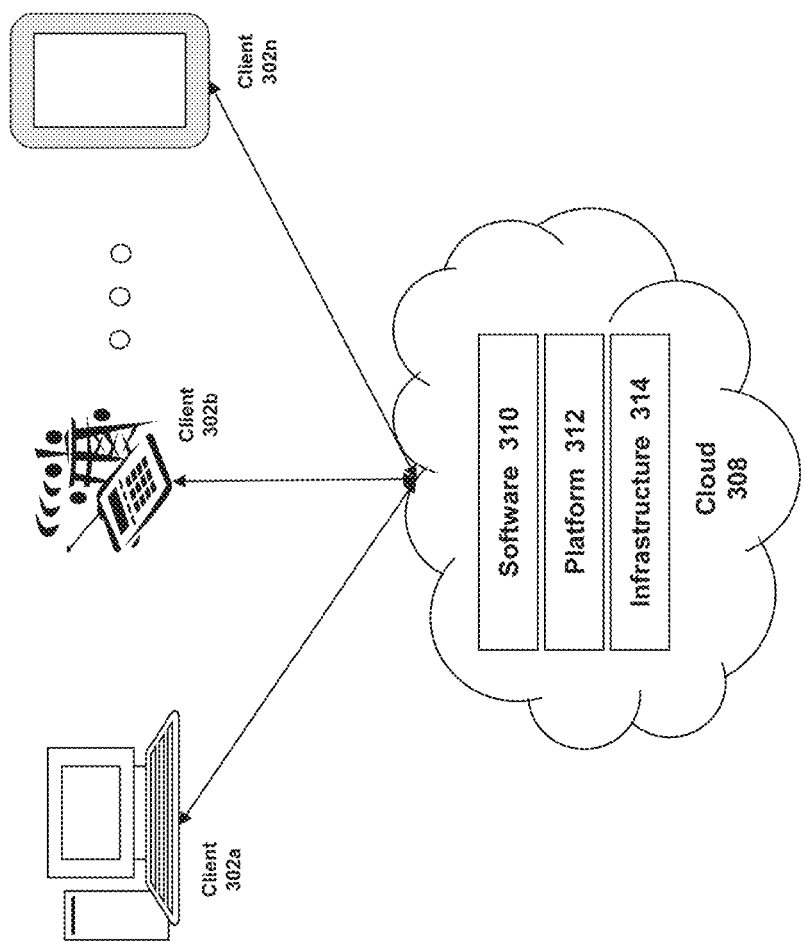
FIG. 3B is a block diagram depicting a cloud computing environment comprising client device in communication with cloud service providers.

Referring to FIG. 3B, a cloud computing environment is depicted. A cloud computing environment may provide client 302 with one or more resources provided by a network environment. The cloud computing environment may include one or more clients 302a-302n, in communication with the cloud 308 over one or more networks 304. Clients 302 may include, e.g., thick clients, thin clients, and zero clients. A thick client may provide at least some functionality even when disconnected from the cloud 308 or servers 306. A thin client or a zero client may depend on the connection to the cloud 308 or server 306 to provide functionality. A zero client may depend on the cloud 308 or other networks 304 or servers 306 to retrieve operating system data for the client device. The cloud 308 may include back end platforms, e.g., servers 306, storage, server farms or data centers.

The cloud 308 may be public, private, or hybrid. Public clouds may include public servers 306 that are maintained by third parties to the clients 302 or the owners of the clients. The servers 306 may be located off-site in remote geographical locations as disclosed above or otherwise. Public clouds may be connected to the servers 306 over a public network. Private clouds may include private servers 306 that are physically maintained by clients 302 or owners of clients. Private clouds may be connected to the servers 306 over a private network 304. Hybrid clouds 308 may include both the private and public networks 304 and servers 306.

The cloud 308 may also include a cloud based delivery, e.g., Software as a Service (SaaS) 310, Platform as a Service (PaaS) 314, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 302 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 302 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 302 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 302 may also access SaaS resources through smartphone or tablet applications, including, e.g., Salesforce Sales Cloud, or Google Drive app. Clients 302 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 3C:
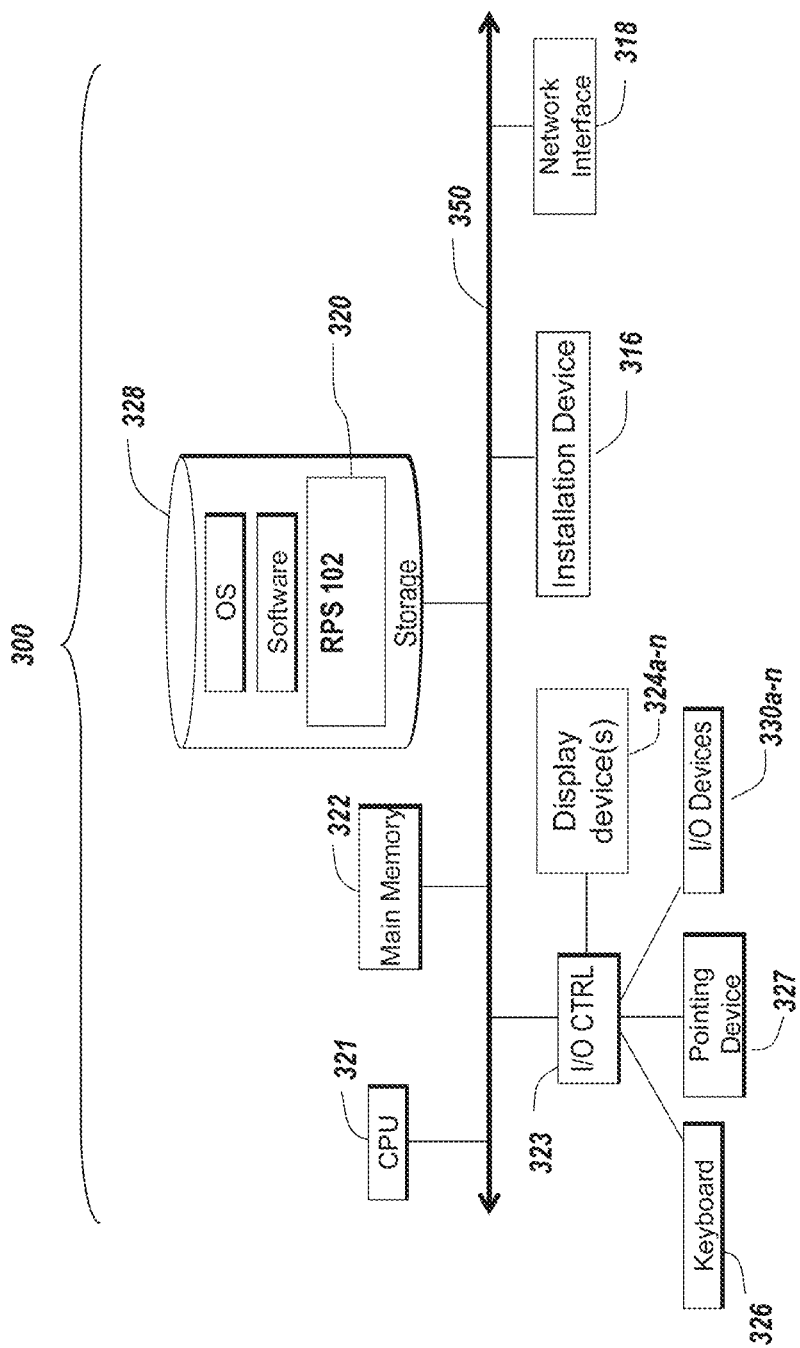
FIGS. 3C and 3D are block diagrams depicting embodiments of computing devices useful in connection with the methods and systems described herein.
Figure 3D:
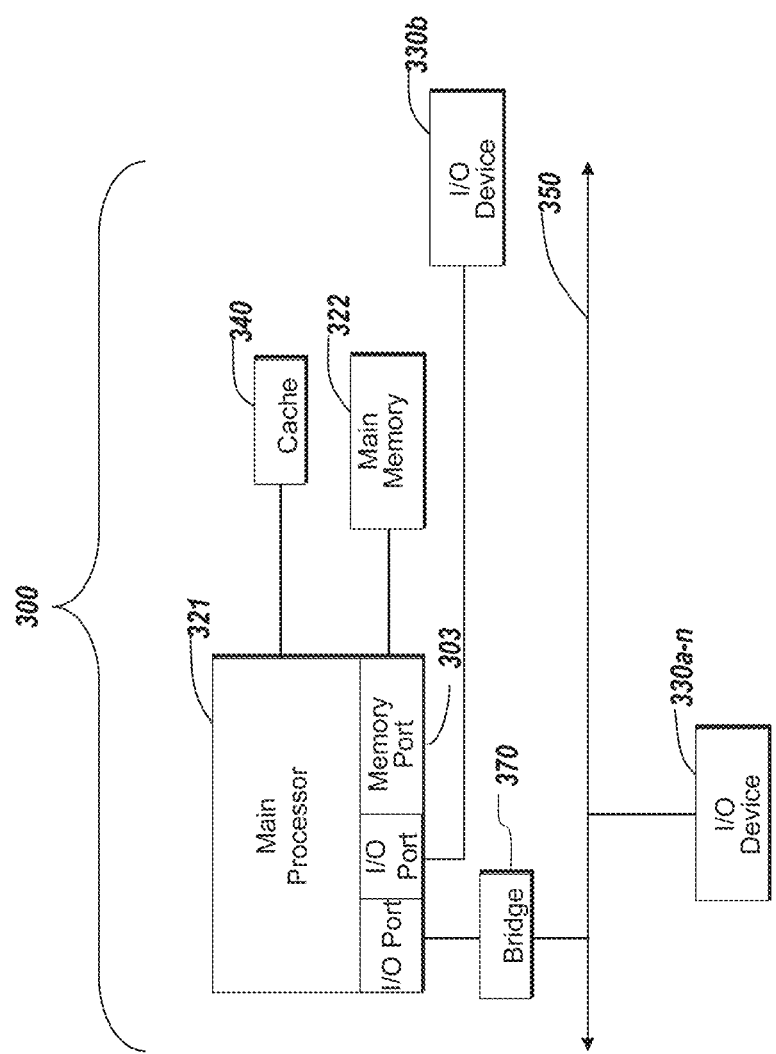

The client 302 and server 306 may be deployed as and/or executed on any type and form of computing device, e.g., a computer, network device or appliance capable of communicating on any type and form of network and performing the operations described herein. FIGS. 3C and 3D depict block diagrams of a computing device 300 useful for practicing an embodiment of the client 302 or a server 306. As shown in FIGS. 3C and 3D, each computing device 300 includes a central processing unit 321, and a main memory unit 322. As shown in FIG. 3C, a computing device 300 may include a storage device 328, an installation device 316, a network interface 318, an I/O controller 323, display devices 324a-324n, a keyboard 326 and a pointing device 327, e.g., a mouse. The storage device 328 may include, without limitation, an operating system, software, and a software of or associated with the system 100. As shown in FIG. 3D, each computing device 300 may also include additional optional elements, e.g., a memory port 303, a bridge 370, one or more input/output devices 330a-330n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 300 may be based on any of these processors, or any other processor capable of operating as described herein. The central processing unit 321 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 322 may include one or more memory chips capable of storing data and allowing any storage location to be directly accessed by the microprocessor 321. Main memory unit 322 may be volatile and faster than storage 328 memory. Main memory units 322 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 322 or the storage 328 may be non-volatile, e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 322 may be based on any of the above described memory chips, or any other available memory chips capable of operating as described herein. In the embodiment shown in FIG. 3C, the processor 321 communicates with main memory 322 via a system bus 350 (described in more detail below). FIG. 3D depicts an embodiment of a computing device 300 in which the processor communicates directly with main memory 322 via a memory port 303. For example, in FIG. 3D the main memory 322 may be DRDRAM.

FIG. 3D depicts an embodiment in which the main processor 321 communicates directly with cache memory 340 via a secondary bus, sometimes referred to as a backside bus. In other embodiments, the main processor 321 communicates with cache memory 340 using the system bus 350. Cache memory 340 typically has a faster response time than main memory 322 and is typically provided by SRAM, BSRAM, or EDRAM. In the embodiment shown in FIG. 3D, the processor 321 communicates with various I/O devices 330 via a local system bus 350. Various buses may be used to connect the central processing unit 321 to any of the I/O devices 330, including a PCI bus, a PCI-X bus, or a PCI-Express bus, or a NuBus. For embodiments in which the I/O device is a video display 324, the processor 321 may use an Advanced Graphics Port (AGP) to communicate with the display 324 or the I/O controller 323 for the display 324. FIG. 3D depicts an embodiment of a computer 300 in which the main processor 321 communicates directly with I/O device 330b or other processors 321' via HYPERTRANSPORT, RAPIDIO, or INFINIBAND communications technology. FIG. 3D also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 330a-330n may include a combination of multiple input or output devices, including, e.g., Microsoft KINECT, Nintendo Wiimote for the WII, Nintendo WII U GAMEPAD, or Apple IPHONE. Some devices 330a-330n allow gesture recognition inputs through combining some of the inputs and outputs. Some devices 330a-330n provides for facial recognition which may be utilized as an input for different purposes including authentication and other commands. Some devices 330a-330n provides for voice recognition and inputs, including, e.g., Microsoft KINECT, SIRI for IPHONE by Apple, Google Now or Google Voice Search.

Additional devices 330a-330n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 330a-330n, display devices 324a-324n or group of devices may be augment reality devices. The I/O devices may be controlled by an I/O controller 323 as shown in FIG. 3C. The I/O controller may control one or more I/O devices, such as, e.g., a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices. In further embodiments, an I/O device 330 may be a bridge between the system bus 350 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 324a-324n may be connected to I/O controller 323. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopy. Display devices 324a-324n may also be a head-mounted display (HMD). In some embodiments, display devices 324a-324n or the corresponding I/O controllers 323 may be controlled through or have hardware support for OPENGL or DIRECTX API or other graphics libraries.

In some embodiments, the computing device 300 may include or connect to multiple display devices 324a-324n, which each may be of the same or different type and/or form. As such, any of the I/O devices 330a-330n and/or the I/O controller 323 may include any type and/or form of suitable hardware, software, or combination of hardware and software to support, enable or provide for the connection and use of multiple display devices 324a-324n by the computing device 300. For example, the computing device 300 may include any type and/or form of video adapter, video card, driver, and/or library to interface, communicate, connect or otherwise use the display devices 324a-324n. In one embodiment, a video adapter may include multiple connectors to interface to multiple display devices 324a-324n. In other embodiments, the computing device 300 may include multiple video adapters, with each video adapter connected to one or more of the display devices 324a-324n. In some embodiments, any portion of the operating system of the computing device 300 may be configured for using multiple displays 324a-324n. In other embodiments, one or more of the display devices 324a-324n may be provided by one or more other computing devices 300a or 300b connected to the computing device 300, via the network 304. In some embodiments software may be designed and constructed to use another computer's display device as a second display device 324a for the computing device 300. For example, in one embodiment, an Apple iPad may connect to a computing device 300 and use the display of the device 300 as an additional display screen that may be used as an extended desktop. One ordinarily skilled in the art will recognize and appreciate the various ways and embodiments that a computing device 300 may be configured to have multiple display devices 324a-324n.

Referring again to FIG. 3C, the computing device 300 may comprise a storage device 328 (e.g., one or more hard disk drives or redundant arrays of independent disks) for storing an operating system or other related software, and for storing application software programs such as any program related to the software 320 for the experiment tracker system. Examples of storage device 328 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 328 may be non-volatile, mutable, or read-only. Some storage device 328 may be internal and connect to the computing device 300 via a bus 350. Some storage device 328 may be external and connect to the computing device 300 via an I/O device 330 that provides an external bus. Some storage device 328 may connect to the computing device 300 via the network interface 318 over a network 304, including, e.g., the Remote Disk for MACBOOK AIR by Apple. Some client devices 300 may not require a non-volatile storage device 328 and may be thin clients or zero clients 302. Some storage device 328 may also be used as an installation device 316, and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 300 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 302. An application distribution platform may include a repository of applications on a server 306 or a cloud 308, which the clients 302a-302n may access over a network 304. An application distribution platform may include application developed and provided by various developers. A user of a client device 302 may select, purchase and/or download an application via the application distribution platform.

Furthermore, the computing device 300 may include a network interface 318 to interface to the network 304 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 300 communicates with other computing devices 300' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Florida. The network interface 318 may comprise a built-in network adapter, network interface card, PCMCIA network card, EXPRESSCARD network card, card bus network adapter, wireless network adapter, USB network adapter, modem or any other device suitable for interfacing the computing device 300 to any type of network capable of communication and performing the operations described herein.

A computing device 300 of the sort depicted in FIGS. 3B and 3C may operate under the control of an operating system, which controls scheduling of tasks and access to system resources. The computing device 300 can run any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 300 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 300 is a gaming system. For example, the computer system 300 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 300 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 300 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 300 is a tablet, e.g., the IPAD line of devices by Apple; GALAXY TAB family of devices by Samsung; or KINDLE FIRE, by Amazon.com, Inc. of Seattle, Washington. In other embodiments, the computing device 300 is an eBook reader, e.g., the KINDLE family of devices by Amazon.com, or NOOK family of devices by Barnes & Noble, Inc. of New York City, New York.

In some embodiments, the communications device 302 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 302 is a laptop or desktop computer equipped with a web browser and a microphone and speaker system, e.g. a telephony headset. In these embodiments, the communications devices 302 are web-enabled and can receive and initiate phone calls. In some embodiments, a laptop or desktop computer is also equipped with a webcam or other video capture device that enables video chat and video call.

In some embodiments, the status of one or more machines 302, 306 in the network 304 can be monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

As described in connection with FIG. 1A, the backstage component 106 can initiate or otherwise execute one or more applications during the hidden desktop session. One example application, which may be executed via the RMS 102 or natively on the remote computing device 122, is a taskbar, which can include one or more icons that launch applications within the hidden desktop session. The taskbar may be executed when the hidden desktop initiated. The taskbar can include a menu, a search function, and additional user interfaces to kill individual process trees, launch additional instances of processes, or close graphical user interfaces (e.g., windows) that are presented in the hidden desktop by the applications launched via the taskbar. Menus presented by the taskbar can present lists of files, programs, or other software present on the end user's computing device.

The creation of a taskbar within the hidden desktop session enables technicians to provide further control over applications that provide GUIs for tools that may be utilized by technicians. Technicians can utilize the applications and tools provided via the taskbar to manage, debug, and remediate issues remotely through a host client interface of the technical solution of the present disclosure. The taskbar can provide a full interactive graphical user interface within the hidden desktop session, and may be utilized to efficiently execute and manage native applications or web-based applications that provide their own graphical user interfaces, without interfering with or observing the work of the end user.

Figure 4A:
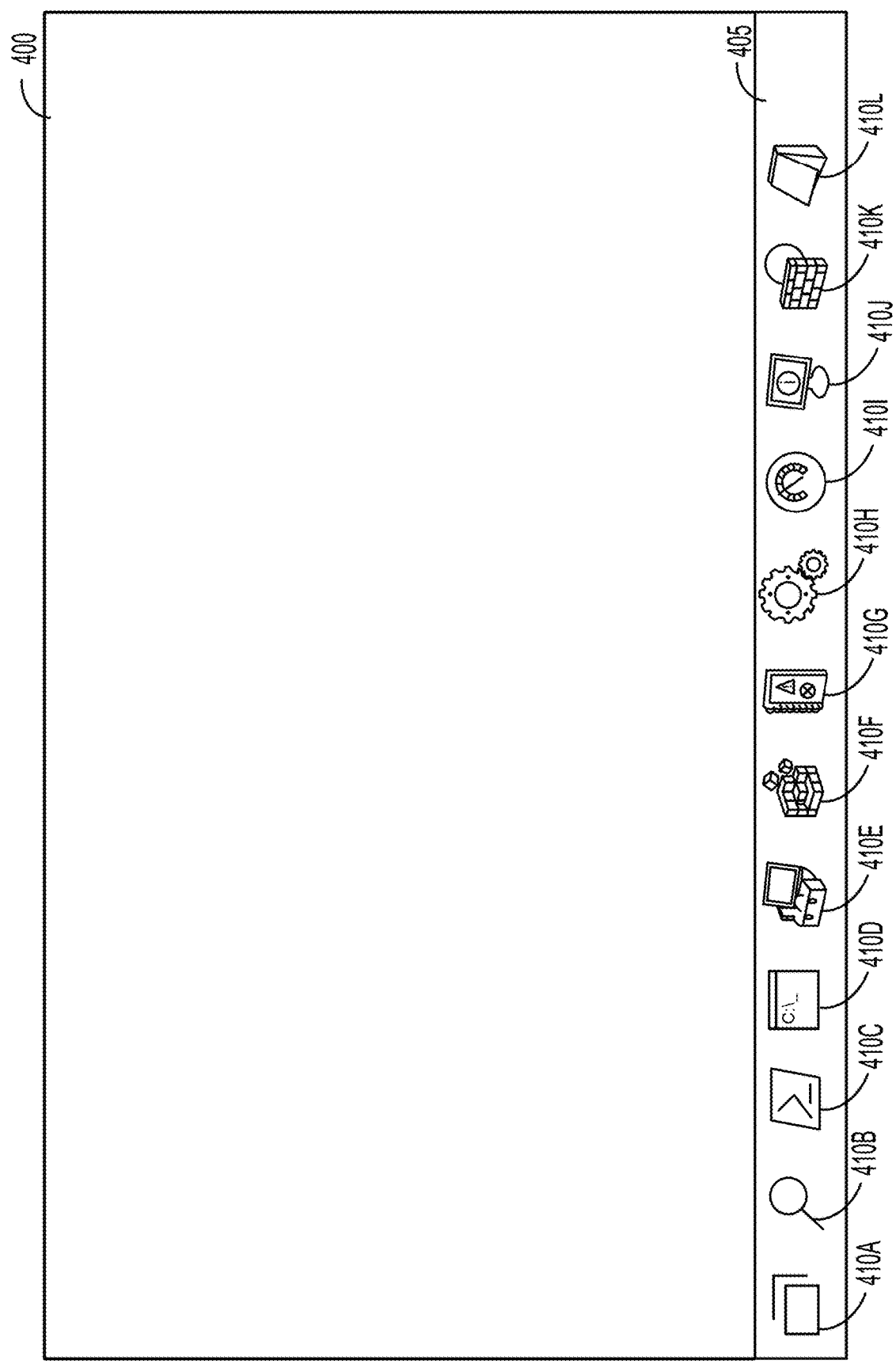
FIG. 4A depicts an illustrative graphical user interface provided by the system depicted in FIG. 1A, including a taskbar with multiple icons.

Referring to FIG. 4A in the context of the components of FIG. 1A, depicted an illustrative graphical user interface of a hidden desktop 400 provided by the system depicted in FIG. 1A including a taskbar 405 with multiple icons 410A-410L. The taskbar 405 may be presented by an application that executes on the remote computing device (e.g., the remote computing device 122 of FIG. 1A) when the hidden desktop 400 is initiated. The hidden desktop 400 can be similar to the hidden desktop. When the backstage component 106 generates the hidden desktop (session), the backstage component 106 may execute an application within the system session on the remote computing device that presents the taskbar 405. In some implementations, the taskbar 405 can be provided by one or more web applications running in the system session (e.g., displayed via a web-browser frame, etc.). The application that provides the taskbar 405 can access internal configuration of the remote computing device 122 to identify the locations of files, executables, shortcuts, or other types of data that may be presented in the various user interfaces described herein.

The application can provide the taskbar 405 as a graphical user interface within the hidden desktop 405. The taskbar 405 can include the icons 410A-410L (sometimes generally referred to the "icon(s) 410"), each of which can correspond to a respective application, command, or functionality of the application providing the taskbar 405. Although multiple icons 410A-410L are shown, it should be understood that the taskbar 405 may present any number of icons, each of which may correspond to a respective application or functionality that may be executed or provided by the application presenting the taskbar 405. The taskbar 405 can improve the efficiency of accessing the application on the remote computing device 122, without requiring the use of a power shell or other command line interface to execute applications or locate files.

Each icon 410 presented on the taskbar 405 can represent a corresponding application or functionality of the hidden desktop session. Each icon 410 can be an interactive icon, that when interacted with, causes the application providing the taskbar 405 to perform functionality corresponding to that icon 410. Interactions can include mouse clicks, mouse gestures, hot-keys or other keyboard input, touchscreen taps, swipes, or gestures, among other types of input. The interactions can be provided, for example, at the host computing device 120, and communicated to the application providing the taskbar 405 in the hidden desktop session 400 via the RMS 102. In some implementations, the taskbar 405 can include one or more regions that present notifications or messages (e.g., a system tray). Such regions may display alerts, messages, system status information, hidden desktop session status information, information relating to the remote computing device 122, or other such information.

The example icons 410A-410L presented on the taskbar 405, as described herein, correspond to non-limiting example functionality that may be provided via the application presenting the taskbar 405 or the hidden desktop session executing on the remote computing device 122. The icon 410A corresponds to a menu, and when interacted with can cause presentation of the menu described in connection with FIG. 4B. The icon 410B corresponds to search functionality, and when interacted with, can cause presentation of the search interface described in connection with FIGS. 4C and 4D. The icon 410C corresponds to a power shell command line tool, and when interacted with, can cause the remote computing device 122 to execute a first command line (e.g., a power shell provided by the operating system of the remote computing device 122) in the hidden desktop session.

The icon 410D corresponds to another command line tool, and when interacted with, can cause the remote computing device 122 to execute a second type of command line tool. The command line tool may be a native command line tool provided by the operating system of the remote computing device 122. The icon 410E corresponds to a computer management application that is provided by the operating system of the remote computing device 122, and when interacted with, can cause execution of the computer management application in its own GUI in the hidden desktop session.

The computer management application can be a native application of the operating system of the remote computing device 122. The computer management application can provide a graphical user interface for managing various aspects of the remote computing device 122. For example, the computer management application can provide a window that displays a range of tools for managing hardware resources, system services, and performance monitoring, as well as tools for managing shared folders, users and groups, and system security. The computer management application can be utilized to perform various administrator-level tasks, including management of devices connected to the remote computing device 122, disk management, and viewing operating system events, among other functionality.

The icon 410F corresponds to a registry application that is provided by the operating system of the remote computing device 122, and when interacted with, can cause execution of the registry application within the hidden desktop session. The registry application can be utilized to modify a registry of the operating system executing on the remote computing device 122. The registry can include a database that stores configuration settings and options for the operating system and applications that execute via the operating system. The registry can include information about the hardware and software installed on the remote desktop, user preferences, system settings, and other configuration data. The registry can control the behavior and appearance of the system, as well as the performance of applications on the remote computing device 122.

The registry application can provide a graphical user interface that can be utilized to viewing and editing the contents of the registry. The graphical user interface of the registry application can provide a hierarchical view of the registry, and can enable a technician accessing the hidden desktop session via the host computing device 120 to access keys and values that make up the registry database. The registry application can be utilized to add, modify, or delete keys and values, as well as change system settings. In some implementations, the application executing the taskbar 405 can perform an automatic backup of the registry in response to an interaction with the icon 410F (e.g., prior to launching the registry application).

The icon 410G corresponds to an event viewer application that is provided by the operating system of the remote computing device 122, and when interacted with, can cause execution of the event viewer application within the hidden desktop session. The event viewer application can provide a graphical user interface that enables a technician to access a centralized log of system and application events that occur or have occurred at the remote computing device 122. The event viewer application can be utilized to monitor system activities, track errors and warnings, and diagnose problems with the remote computing device 122.

The event viewer application can track and display events related to applications that execute or have executed on the remote computing device 122, such as errors and warnings. The event viewer application can track and display events related to the operating system of the remote computing device 122, such as startup and shutdown events, hardware events, and security events. The event viewer application can track and display events related to system security, such as logon and logoff events, and events related to access control and permissions. The event viewer application can display information about detected or stored events in a graphical user interface presented in the hidden desktop 400. Such information can include information about each event, such as an event timestamp, a source of the event, and an identifier of the event, among others.

The icon 410H corresponds to a services application that is provided by the operating system of the remote computing device 122, and when interacted with, can cause execution of the event viewer application within the hidden desktop session. The services application can be used to manage, start, stop, and view manage system services of the operating system executing on the remote computing device 122. System services include programs or software that run in the background on the remote computing device 122 to support the operating system and its applications. Some example services provide functionality such as supporting file and print sharing, managing network connections, and running other essential system components.

The services application can provide a list of services of the operating system in a graphical user interface of on the hidden desktop 400. Each service may be listed with a corresponding status, start-up type, and description. The graphical user interface of the services application can include interactive elements that enable a technician to start, stop, pause, or restart services, as well as to change the start-up type of services to either automatic, manual, or disabled. The status of each service can indicate whether the service is running, stopped, or paused. The start-up type of a service indicates how the service is started (e.g., automatically when the operating system starts, manually by an administrator, etc.). The graphical user interface of the services application may also provide a description of each service, including information about the purpose and function of the service.

The icon 410I corresponds to a resource monitor application that is provided by the operating system of the remote computing device 122, and when interacted with, can cause execution of the resource monitor application within the hidden desktop session. The resource monitor application can provide information about the usage of system resources on the remote computing device 122, such as the CPU, memory, disk, and network. The resource monitor application can provide information in real-time or near real-time about the usage of various system resources on the remote computing device 122, including a graph of CPU utilization, amounts of memory used or allocated to processes executing on the remote computing device 122, disk activity information (e.g., read and write activity, etc.), and network traffic information (e.g., for one or more network interfaces of the remote computing device 122).

The resource monitor application can provide a graphical user interface in the hidden desktop 400 that includes detailed information about processes executing on the remote computing device 122, including a process identifier, a process name, a username under which the process is executing, CPU utilization, memory usage, disk activity information, and network traffic information for each process. This information can be used by a technician operating the host computing device 120 to diagnose performance problems, identify resource-intensive processes, and determine which processes are affecting system performance on the remote computing device 122. The resource monitor application can provide functionality to configure resource utilization thresholds and receive alerts when these thresholds are exceeded. The resource monitor application can provide detailed information about system drivers and services in one or more graphical user interfaces.

The icon 410J corresponds to a system information application that is provided by the operating system of the remote computing device 122, and when interacted with, can cause execution of the system information application within the hidden desktop session. When executed, the system information application can provide a graphical user interface in the hidden desktop that presents information about the hardware and software configuration of the remote computing device 122. Some non-limiting examples of such information include the processor type, memory configuration, installed components, and software settings of the remote computing device 122. The system information application can provide details about the operating system of the remote computing device 122, including the version number, installed service packs, and product key. The system information application can provide information about the performance of the system, including the current speed of the processor, the available memory, and the amount of free disk space. This information can be used by a technician operating the host computing device 120 to diagnose performance problems, identify potential bottlenecks, and optimize system performance of the remote computing device 122.

The icon 410K corresponds to an antivirus application that is provided by the operating system of the remote computing device 122, and when interacted with, can cause execution of the antivirus application within the hidden desktop session. When executed, the antivirus application can provide one or more user interfaces in the hidden desktop that present information about viruses or other security threats. The antivirus application can provide real-time protection against a wide range of threats, including viruses, Trojans, worms, and spyware. The graphical interface of the antivirus application can provide options to perform system scans, directory scans, or to scan individual files for viruses, Trojans, worms, spyware, or other security threats. To do so, the antivirus application can utilize various threat techniques, including signature-based detection, heuristics, and machine learning algorithms to detect and remove malware. Signature-based detection can utilize a database (e.g., a local or remote database hosted in part by the RMS 102 or another external computing system, for example) of known malware signatures to identify and remove known threats. The heuristics and machine learning algorithms can be used to detect new and evolving threats that are not yet in the signature database.

The antivirus application can present options or interactive user interface elements in a graphical user interface presented in the hidden desktop 400 that enable a technician to schedule scans, configure real-time protection settings, and view quarantined files, among other operations. Scheduling scans includes performing full system scans on demand, scheduling scans to run automatically at a specified time, or scheduling scans to be performed in response to one or more events (e.g., at the remote computing device 122, in response to commands from the host computing device 120 or the RMS 102, etc.). The antivirus application can present options or interactive user interface elements to configure a firewall of the operating system of the remote computing device 122, which can be utilized to prevent unauthorized access and attacks from the internet or other networks. The configuration options include security settings for one or more applications, services, or operating system features, including blocking or allowing incoming and outgoing network traffic.

The icon 410L corresponds to notepad application of the remote computing device 122, and when interacted with, can cause execution of the notepad application within the hidden desktop session. The notepad application can provide a graphical user interface that with an interactive text editor, which enables a technician to create and edit text files or other files. The notepad application may include formatting or additional features (e.g., syntax highlighting, search functionality, etc.) for text or other data. The notepad application can provide cut, copy, paste, undo, and redo, as well as search and replace functionality. The notepad application can provide options for changing the font size and type, and for selecting the color of the text and background.

The icons 410 provided via the taskbar 405 can be interactive and may present additional or alternative menus in response to different interactions. For example, a contextual menu may be presented in response to a second type of interaction with an icon 410 representing an application currently executing in the hidden desktop session. In some implementations, the taskbar 405 can detect when additional applications or services are launched in the hidden desktop session, and provide a corresponding icon in the taskbar 405 for the additional applications or services. Said icons can enable a user to launch another instance of the application(s), kill a process tree corresponding to the application(s), or close windows corresponding to the application(s), among others, in a contextual menu. Details of the contextual menu are described in connection with FIG. 4E.

Figure 4B:
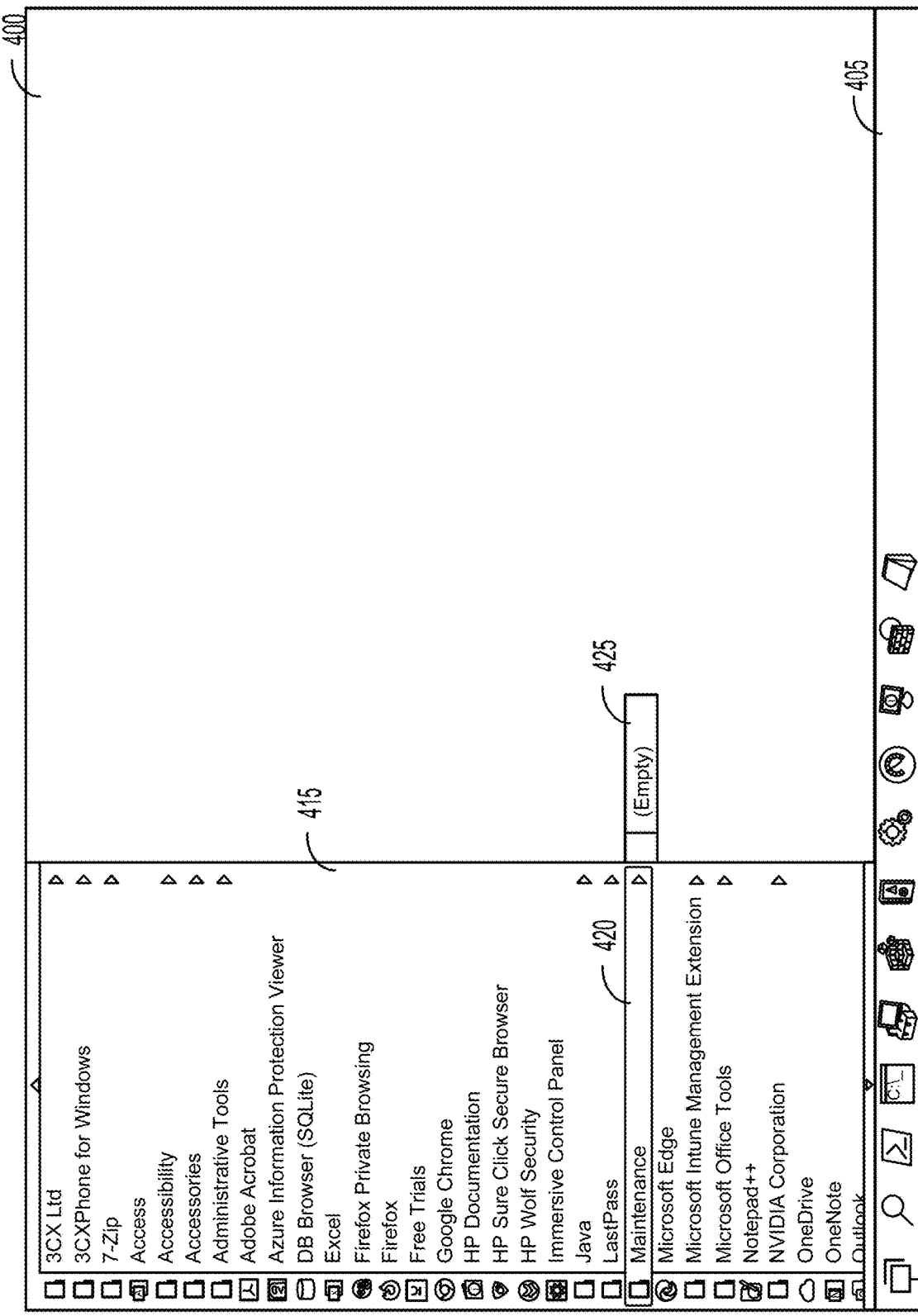
FIG. 4B depicts the illustrative graphical user interface of FIG. 4A following an interaction with a first icon that presents a menu.

Referring to FIG. 4B in the context of the components and functionality described in FIGS. 1A and 4A, depicted the illustrative graphical user interface of the hidden desktop 400 of FIG. 4A following an interaction with a first icon 410A that presents a menu 415. The menu 415 can be presented in the hidden desktop 400 by the application that provides the taskbar 405. The menu 415 can include a list of entries 420 (identified as a single entry in FIG. 4B for visual clarity). Each entry 420 can correspond to a respective program, folder, or file present on the remote computing device 122. The application that provides the taskbar 405 can populate the menu, for example, by accessing and parsing one or more configuration files or folders present on the remote computing device 122, and providing an entry 420 for each program, folder, or file specified in the configuration files or folders. In some implementations, the application that provides the taskbar 405 can iterate through a predetermined directory structure that includes multiple shortcuts to files, folders, or executables, and populate the menu 415 with a respective entry 420 for each shortcut or sub-folder detected within the directory structure.

When hovering over an entry 420 in the menu 415, the application that provides the taskbar 405 can highlight the entry 420 with an additional graphical feature (e.g., an overlay, a color change, etc.). When hovering over an entry 420 that represents a directory, the application that provides the taskbar 405 can present a sub-menu 425 that shows the contents (if any) of the directory. In the example shown in FIG. 4B, a technician is hovering over the "Maintenance" entry 420, which is empty, and therefore the sub-menu 425 includes no additional entries (e.g., an "(empty)" entry).

Upon selection (e.g., a click, gesture, tap, etc.) of an entry, the application that provides the taskbar 405 can execute (e.g., via operating system calls or commands) an application corresponding to the respective entry. For example, if a selected entry 420 is a shortcut corresponding to an application, the application that provides the taskbar 405 can parse the shortcut to execute the corresponding file. If a selected entry 420 is a file, the application that provides the taskbar 405 can execute a second application assigned to open the selected file. In some implementations, the application that provides the taskbar 405 may present only a subset of files present on the remote computing device 122 in the menu 415, for example, only entries 420 corresponding to executables or installed programs on the remote computing device 122. The application that provides the taskbar 405 may be configured by settings stored internally or externally (e.g., via the host computing device 120 or the RMS 102) to present any type of information that may be useful to a technician in the menu 415.

Figure 4C:
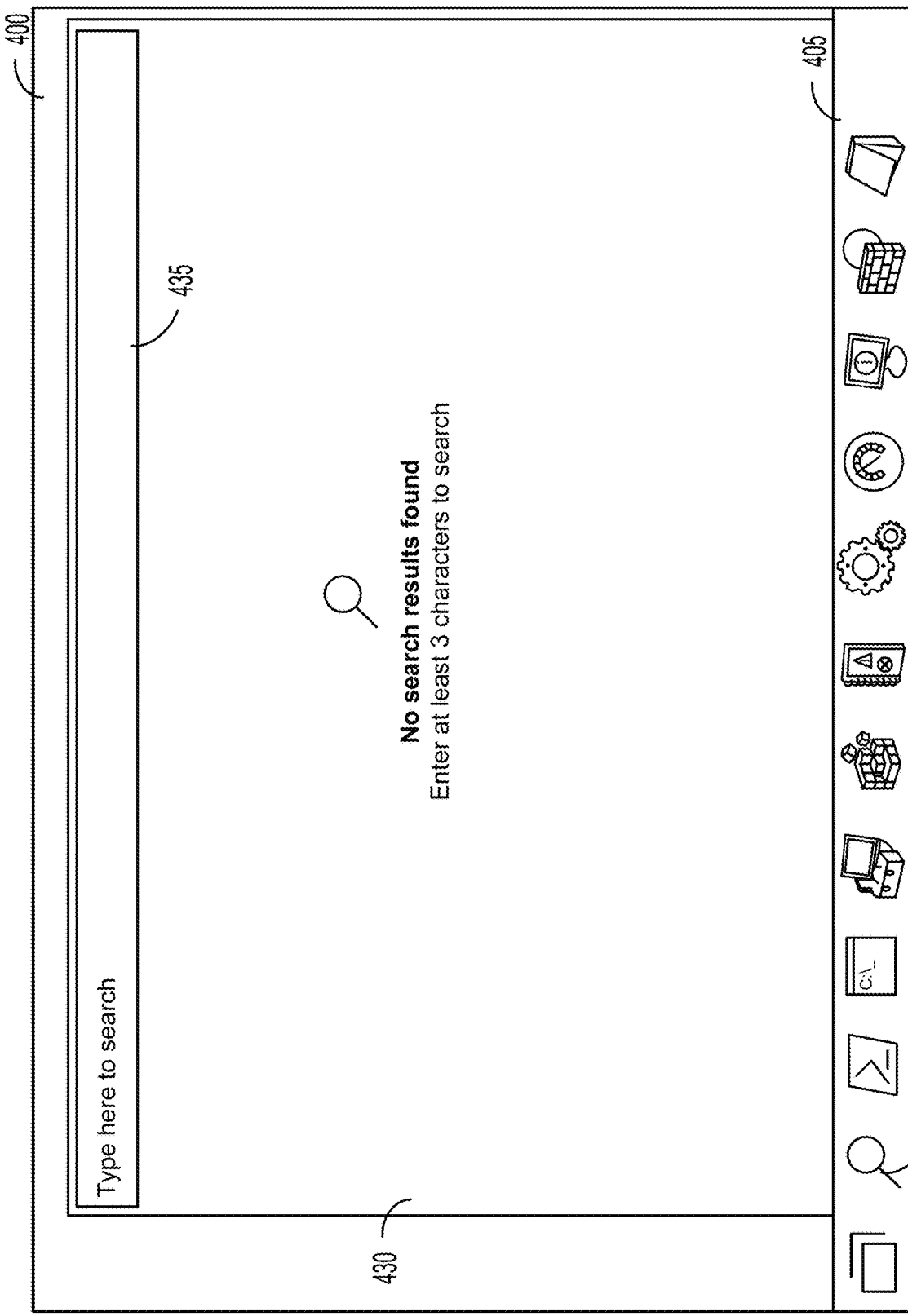
FIG. 4C depicts an illustrative graphical user interface of FIG. 4A following an interaction with a second icon that presents a search interface.

Referring to FIG. 4C in the context of the components and functionality described in FIGS. 1A and 4A, depicted is an illustrative graphical user interface of the hidden desktop 400 of FIG. 4A following an interaction with a second icon 410B that presents a search interface 430. As shown, the search interface 430 includes a text-entry box 435, which can receive text input provided via the host computing device 120. The search interface 430 can be utilized to search for applications, files, settings, and other resources on the remote computing device 122. The search interface 430 may be provided as part of the application that provides the taskbar 405, or may be provided by a second application that executes in response to an interaction with the icon 410B.

The text-entry box 435 enables a technician to type or otherwise provide a search query to the application presenting the search interface 430. The search query can be utilized by the application to locate and present locations of one or more files, folders, or executables having names that correspond to the search query. As shown, if no text has been entered, the text-entry box 430 can provide a prompt (e.g., "Type here to search"), and the search interface 430 can indicate that no search results have yet been identified. In some implementations, the search functionality can prompt entry of a search query that has greater than a predetermined number of characters (in this example, three or more characters). When a search query is provided, the search interface 430 can be updated as shown in FIG. 4D.

Figure 4D:
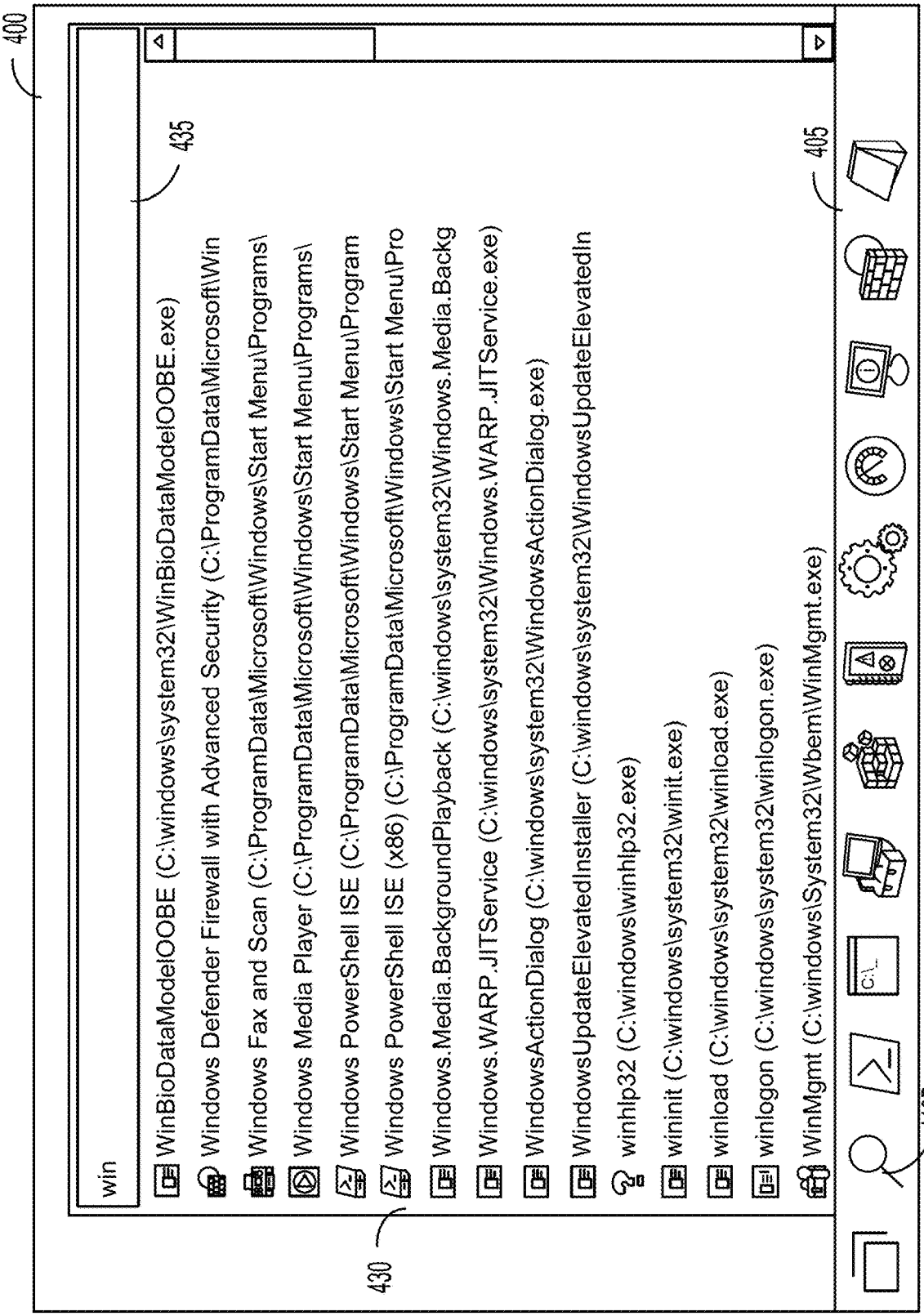
FIG. 4D depicts the illustrative graphical user interface of FIG. 4C following entry of a search query into the search interface.

Referring to FIG. 4D in the context of the components and functionality described in connection with FIGS. 1A and 4C, depicted is the illustrative hidden desktop 400 including the search interface 430 of FIG. 4C following entry of a search query into the text-entry box 435. In this example, the string "win" has been provided as a search query to the text-entry box 435. The application providing the search interface 430 can execute a searching algorithm to enumerate files or installed programs on the remote computing device 122 that have names matching the provided query. The results can be provided in the search interface 430. The results of the search may include a name of the program, and may include other information about the program (e.g., an icon corresponding to the program, a path identifying the location of the program on the remote computing device 122, etc.). In some implementations, the application providing the search interface 430 can provide real-time results, such that a list of relevant applications, files, or settings that match the search query are provided as the query is typed or otherwise provided into the text-entry box 435. In some implementations, the application providing the search interface 430 can provide search results in response to an interaction with a button or a hot-key (e.g., the enter key, etc.). Selection of a corresponding search result can cause the application providing the search interface 430 to launch the respective application represented by the search result.

Figure 4E:
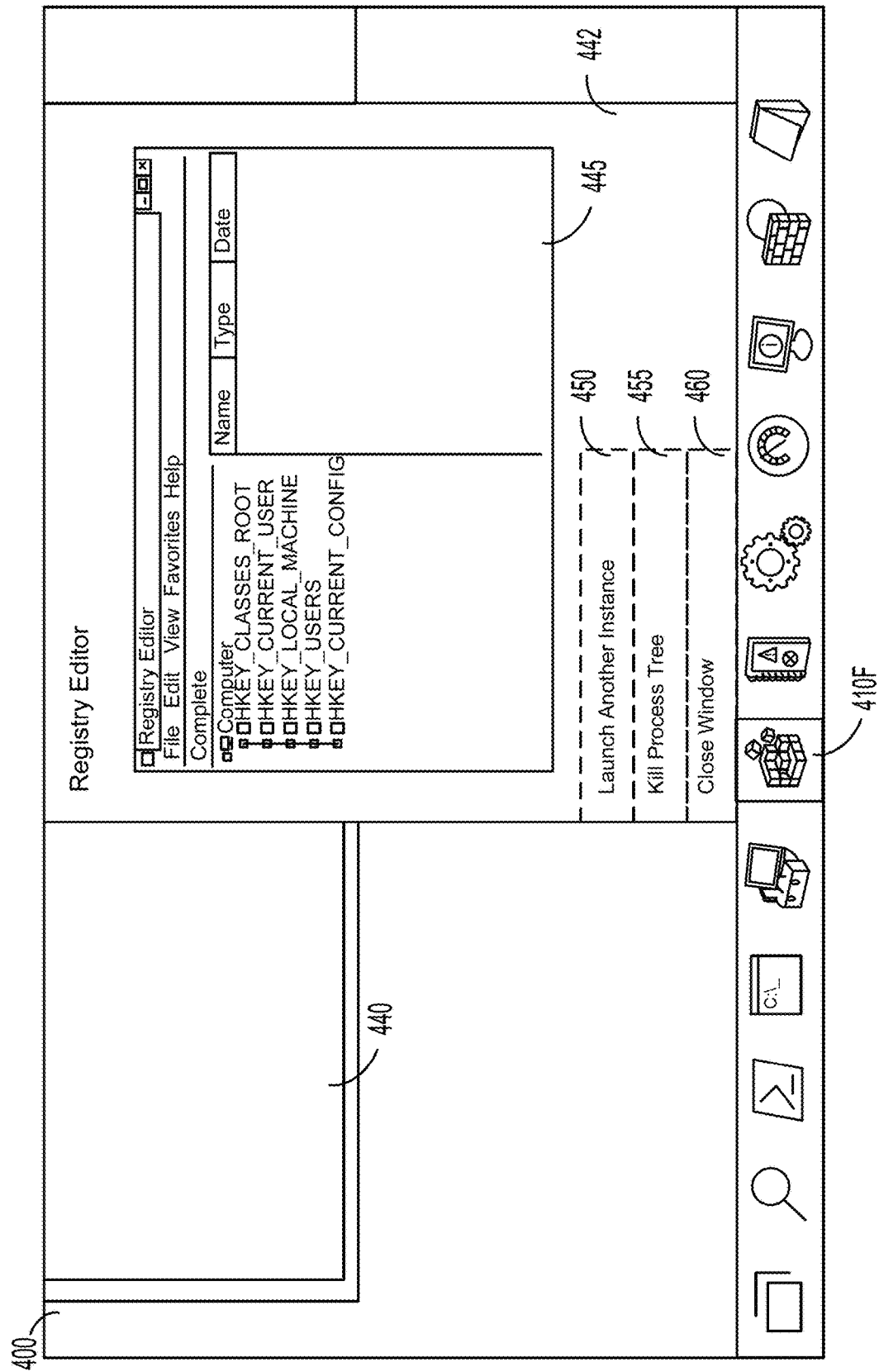
FIG. 4E depicts an illustrative graphical user interface of FIG. 4A including a sub-interface presented in response to an interaction with a third icon that represents a process executing within the hidden desktop session.

Referring to FIG. 4E in the context of the components and functionality described in connection with FIGS. 1A and 4A, depicted is an illustrative graphical user interface of a contextual menu 442 displayed as an overlay in the hidden desktop 400 of FIG. 4A in response to an interaction with a third icon 410F that represents a process executing within the hidden desktop session. In this example, a technician has previously interacted with the icon 410F presented on the taskbar 405 to execute the registry application, which is presenting a corresponding graphical user interface 440 (e.g., a window) in the hidden desktop 400. Upon a second interaction with the icon 410F representing the executing process, the application presenting the taskbar 405 can present the contextual menu 442 (sometimes referred to as a "sub-interface"), which provides process management functionality.

As shown, the contextual menu 442 presents a full, miniaturized rendering 445 of the window 440 corresponding to the executing process (in this example, the registry application). The contextual menu 442 further includes interactive user interface elements that enable process management. In a non-limiting example, the contextual menu 442 can include one or more of a first button 450 to launch another instance of the process, a second button 455 to kill a process tree of the process, and a third button 460 to close one or more windows or graphical user interfaces provided by the process. In some implementations, the application providing the contextual menu 442 can determine whether the operating system supports launching multiple instances of the process (e.g., by accessing configuration settings or calls/functions of the operating system) prior to presenting the first button 450. If multiple instances are not supported, the application providing the contextual menu 442 may hide or restrict display or selection of the first button 450.

An interaction with the first button 450, if the first button 450 is selectable, can cause the application providing the contextual menu 442 to execute a second instance of the application represented by the icon 410 (in this case, the registry application). In various implementations, the second instance may be executed as part of the same or a different process tree. An interaction with the second button 455, if the first button 450 is selectable, can cause the application providing the contextual menu 442 to execute one or more operating system functions or calls to kill the process tree 455 of the application represented by the icon 410. The process tree can include a root process (e.g., the application corresponding to the respective icon 410), as well as any processes executed as sub-processes by the root process. An interaction with the first button 450, if the first button 450 is selectable, can cause the application providing the contextual menu 442 to execute one or more operating system calls or functions to send a message to the application corresponding to the icon 410 to close one or more windows or graphical user interfaces provided by the application corresponding to the icon 410.

Although not shown here, additional interactive buttons, links, graphics, or user interface elements may be presented in contextual menu 442 to control the window 440. For example, an interaction with the rendering 445 may cause the window 440 to grab focus within the hidden desktop 400. In some implementations, additional interactive elements to close, maximize, or minimize the window 440 may be provided in the contextual menu 442. If the application corresponding to the icon 410 (in this example, the icon 410F) includes multiple windows or graphical user interfaces within the hidden desktop 400, the application providing the taskbar 405 may present multiple contextual menus 442, or in some implementations, multiple renderings 445 for each window or graphical user interface within the contextual menu 442.

Referring to FIG. 5 in the context of the components and functionality of FIGS. 1A and 4A-4E, depicted is an illustrative graphical user interface 500 that may be utilized to adjust permissions corresponding to computing devices within the system shown in FIG. 1A. The graphical user interface 500 can be provided, for example, in one or more web-based interfaces provided by the RMS 102. For example, the RMS 102 can provide a webpage or web-based interface to the host computing device 120, such that the host computing device 120 can configure settings for different remote computing devices 122. In some implementations, prior to establishing a connection between the host computing device 120 and the remote computing device 122, or prior to creating the hidden desktop on the remote computing device 122, the RMS 102 can determine whether a permission for the remote computing device 122 is set that authorizes creation of hidden desktops.

In this example user interface 500, the permission can be set by the host computing device 120 (or by a user of the remote computing device 122), by activating the configuration setting 505. If the permission is not set for a remote computing device 122, the RMS 102 may present an error to the host computing device 120 if the host computing device 120 attempts to create or activate a hidden desktop on the remote computing device 122. The configuration setting may be saved for the remote computing device 122 by interacting with the "Save Role" button 510. In some implementations, the user interface 500 may automatically save the state of the configuration setting 505 in response to an interaction with the configuration setting 505. Additional configuration settings may also be set for the remote computing device 122 or the host computing device 120 via the user interface 500, as shown.

Configuration settings for remote computing devices 122 or host computing devices 120 may be stored in memory of the RMS 102, or locally at each of the remote computing devices 122 or host computing devices 120. In some implementations, the user interface 500 can provide configuration settings to launch (or not to launch) the application that provides the taskbar 405 described in connection with FIGS.

4A-4E. In implementations where the taskbar 405 of FIGS. 4A-4E is provided by the RMS 102 (e.g., via an application executing on the RMS 102 or provided to execute on the host computing device 120), the configuration settings can specify whether the RMS 102 presents the taskbar 405 when presenting the hidden desktop provided via the remote computing device 122.

Figure 6:
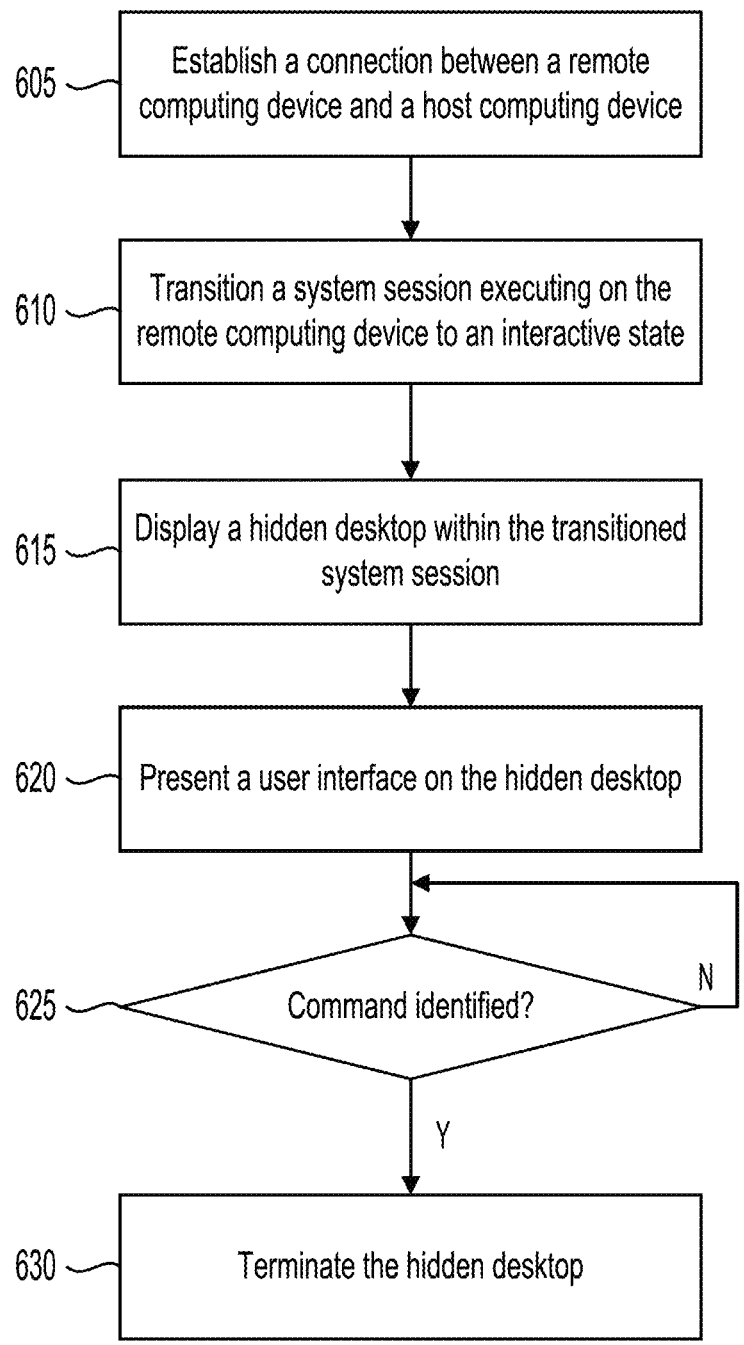
FIG. 6 depicts an illustrative flow diagram of an example a method for remote perspective and control of information technology infrastructure including presentation of the graphical user interfaces shown in FIGS. 4A-4E.

Referring to FIG. 6, depicted is an illustrative flow diagram of an example of method 600 for remote perspective and control of information technology infrastructure including presentation of the graphical user interfaces shown in FIGS. 4A-4E. The functionalities or operations of the method 200 may be implemented using, or performed by the components detailed herein in connection with FIGS. 1A-1G and FIGS. 4A-5.

In brief overview, a remote management system (RMS) can establish a connection between a remote computing device and a host computing device operation 605. The RMS can transition a system session executing on the remote computing device to an interactive state at operation 610. The RMS can display a hidden desktop within the transitioned system session at operation 615. The RMS can present a user interface on the hidden desktop at operation 620. The RMS can determine whether a command has been identified at operation 625. The RMS can terminate the hidden desktop at operation 630. Although the various operations of the method 600 are shown as being performed in a particular order, it should be understood that the operations may be performed in any order to achieve useful results. Additionally, it should be understood that the operations of the method 600 may be performed in addition to or as an alternative to one or more of the operations of the method 200 described in connection with FIGS. 2A-2B.

Referring to operation 605, the RMS (e.g., the RMS 102) can establish a connection between a remote computing device (e.g., the remote computing device 122) and a host computing device (e.g., the host computing device 120). The RMS may establish the connection in response to a request from the host computing device that identifies the remote computing device, or vice versa. In some implementations, the RMS can identify the remote computing device based on a support ticket, and may automatically assign or identify the host computing device based on the support ticket, as described herein.

In some implementation, the RMS can identify the remote computing device based on a support ticket. For example, the remote computing device may initiate the generation of such a support ticket in response to user input, or in response to determining that the remote computing device needs to be re-configured, maintained, repaired, or updated (e.g., based on a system error or alert). In response to the determination, the remote computing device may communicate with the RMS or a support server to generate a support ticket. Upon receiving the request, the RMS may perform functionality similar to that described in connection with FIGS. 2A-2B to manage the support ticket, and identify the remote computing device.

Prior to establishing the connection, the RMS may determine whether a connection exists between the remote computing device and the host computing device. To do so, the RMS may examine, detect, or otherwise determine whether the existing connection is established under a proprietary protocol. Non-limiting examples of such proprietary protocols include one or more of TCP, a VNC protocol, or an RDP, among others. If the RMS determines that no connection exists between the remote computing device and the host computing device, the RMS may establish a connection communicatively coupling the remote computing device to the host computing device under the proprietary protocol. For example, the RMS can instantiate, or transmit instructions to generate, a TCP connection, a VNC connection, an RDP session, or another type of connection, between the host computing device and the remote computing device, as described herein. In some implementations, if a connection is already determined to exist, the RMS can utilize the existing connection to establish and manage the hidden desktop functionality as described herein.

Referring to operation 610, the RMS can transition a system session executing on the remote computing device to an interactive state. Once the connection between the host computing device and the remote computing system has been established or identified, the RMS can identify and control a system session (or session 0) executing on the remote computing device. In doing so, the RMS can communicate with a shell component executing on the remote computing device to hijack, commandeer, overtake or otherwise utilize the system session of the remote computing device. The system session can provide a separate environment from a user environment (on which a user of the remote computing device can access graphical features of the remote computing device) that is initially marked as non-interactive and used for operating system services. By hijacking the system session, the RMS can perform various actions on the hijacked system session (e.g., create a graphical environment on session 0, transmit the graphical environment to the host computing device) without interrupting an end user of the remote computing device.

Once the RMS has controlled the system session of the remote computing device, the RMS may determine whether the system session is in an interactive state by accessing one or more predetermined registry entries of the operating system of the remote computing device. The registry entries can include key-value pairs that define configuration settings for the operating system of the remote computing device. The RMS can access the predetermined entries by accessing the corresponding keys in the registry, and comparing their corresponding values to expected values. The comparison can reveal whether the system session is in an interactive state or a non-interactive state. In response to determining that the system session is in a non-interactive state, the RMS can transition the system session to an interactive state. To do so, the RMS may add a new registry key (and corresponding) to the registry of the operating system of remote computing device to transition the system session from a non-interactive state to the interactive state, or may modify one or more values of one or more existing keys in the registry.

Referring to operation 615, the RMS can display, on the host computing device, a hidden desktop within the transitioned system session. Once the system session has been transitioned to or determined to already be in the interactive state, the RMS can generate a hidden desktop within the now-interactive system session. In doing so, the RMS can generate, create, initiate, launch or spawn a virtual or hidden desktop within the interactive system session to be displayed on a display device of the host computing device, as described herein. To do so, the RMS may communicate with the shell component executing on the remote computing device to compose one or more windows stations within the system session to generate the hidden desktop. For example, the RMS can transmit instructions, commands, or messages to the shell component that cause the shell component to create a graphical environment on the system session, and transmit the graphical environment to the RMS or host computing device.

In some implementations, prior to generating the hidden desktop, the RMS can determine whether the host computing device or the remote computing device are authorized to access or generate a hidden desktop. As described herein, the RMS (or any other computing system, database, or storage described herein) may store one or more permissions relating to remote management functionality. The permissions may be modified, for example, by communicating with the RMS, which may provide a web-based interface (e.g., the interface 500 described in connection with FIG. 5) that enables modification of one or more permissions. Prior to creating the hidden desktop, the RMS can access permissions corresponding to one or more of the remote computing device or the host computing device to determine whether the remote computing device is authorized to create hidden desktops and/or to determine whether the host computing device can access a hidden desktop executing on the remote computing device.

In some implementations, if the remote computing device is authorized to create or otherwise execute the hidden desktop, the RMS can create the hidden desktop on the remote computing device as described herein. Otherwise, the RMS may transmit an error message to the remote computing device or the host computing device, and can record a log of the error in memory of the RMS. In some implementations, the RMS can determine (e.g., via a lookup in the permissions that are managed by the RMS) whether the host computing device is permitted access to the hidden desktop (which may occur prior to, or in some implementations after, creation of the hidden desktop). If the host computing device is not permitted access to the hidden desktop, an error message can be transmitted to the host computing device, and the hidden desktop may be terminated (if executing). Otherwise, the RMS can provide the hidden desktop for display on the host computing device, as described herein.

Referring to operation 620, the RMS can present a user interface (e.g., the hidden desktop 400 interface including the taskbar 405, as described in connection with FIGS. 4A-4E) on the hidden desktop. The user interface may include a taskbar (e.g., the taskbar 405), which presents an icon that launches a second application of the remote computing device within the transitioned system session. To do so, the RMS may transmit instructions, for example, to the remote computing device to execute one or more applications that present the graphical hidden desktop and taskbar interface in the hidden desktop. For example, the remote computing device can store an application, that when executed in the system session, causes display of the taskbar within the hidden desktop. The RMS can then provide graphical representation of the hidden desktop, including the presentation of the taskbar and any icons presented thereon, to the host computing device, as described herein.

In some implementations, the RMS can provide the user interface (e.g., the taskbar and icons displayed thereon) as part of the interface that presents the hidden desktop on the host computing device. In such implementations, the RMS can transmit instructions to the host computing device to display the taskbar as an overlay on the hidden desktop. In response to interactions with the taskbar, as described in connection with FIGS. 4A-4E, the RMS can receive the interactions, and transmit corresponding commands to the remote computing device to cause the remote computing device to execute applications or perform one or more operations within the hidden desktop corresponding to the interaction. Additionally, the RMS can transmit instructions that cause the taskbar to be updated to display additional menus, sub-menus, graphical indicators, additional icons, or other graphical updates on the host computing device.

In some implementations, the application that provides the taskbar and icons presented thereon can be executed at the host computing device when the RMS presents the hidden desktop at the host computing device. In such implementations, the host computing device can display the taskbar (e.g., in a separate window, as an overlay, etc.). In response to interactions with the taskbar, as described in connection with FIGS. 4A-4E, the application can provide the interactions to the RMS, which can receive the interactions, and transmit corresponding commands to the remote computing device to cause the remote computing device to execute applications or perform one or more operations within the hidden desktop corresponding to the interaction. The application can cause the taskbar to be updated to display additional menus, sub-menus, graphical indicators, additional icons, or other graphical updates on the host computing device.

The taskbar interface can present one or more icons that each launch a respective application of the remote computing device within the transitioned system session, as described in connection with FIGS. 4A-4E. The one or more icons may include an icon that, when interacted with, presents a second user interface comprising a list of files stored on the remote computing device (e.g., the menu 415 of FIG. 4B, the search interface 430 of FIGS. 4C-4D, etc.). The one or more icons may include an icon that, when interacted with, presents a search interface that includes field that accepts text input for search queries, as described in connection with FIGS. 4C-4D. The one or more icons may include an icon that, when interacted with, presents a menu within the hidden desktop having entries to terminate the second application, launch a second instance of the second application, and close the menu (e.g., as described in connection with FIG. 4E).

In some implementations, the taskbar can present icons, menu options, or interactive graphical user interface elements that can be used to control the connection between the host computing device and the remote computing device, to control a state of the hidden desktop, or to control a state of the system session, among others. For example, the icons, menu options, or interactive graphical user interface elements can enable a technician operating the host computing device to terminate the hidden desktop, to terminate the connection with the remote computing device, or to transition the system session into a non-interactive state, among other operations.

Referring to operation 625, the RMS can determine whether a command from the host computing device has been identified. For example, the RMS may determine whether one or more instructions have been identified through the hidden desktop. The instructions or commands may be provided via one or more icons, menu options, or interactive graphical user interface elements presented on the host computing device (e.g., as part of the taskbar or the hidden desktop). In some implementations, the RMS may communicate with the host computing device to identify whether one or more instructions have been provided via the hidden desktop displayed to the host computing device. To identify instructions, the RMS can monitor interactions or other input provided to the hidden desktop via the host computing device. In some implementations, the instructions or commands may be inputted as one or more commands into a power shell and/or command prompt of the hidden desktop, rather than via the graphical user interface provided in operation 620. If the RMS determines that no instructions or commands have been identified, the RMS may continue monitoring the connection between the host computing device and the remote computing device to identify any instructions or commands that may occur. If the RMS has identified at least one instruction or command inputted through the hidden desktop via the host computing device, the RMS can perform one or more operations corresponding to the command, if applicable. If the command is a request to terminate the hidden desktop, the RMS can proceed to operation 630.

Referring to operation 630, the RMS can terminate, responsive to a command from the host computing device, the hidden desktop. The command to terminate the hidden desktop may be provided in response to an interaction with corresponding icon presented in the user interface of the hidden desktop. In some implementations, the RMS may receive such a command via the hidden desktop in response to another action performed within the hidden desktop. The RMS may terminate the system session by transitioning the system session from the interactive state back to the non-interactive state. To do so, the RMS may modify, nullify, or delete a registry key or value from the registry of the operating system of the remote computing device to transition the system session back to the non-interactive state.

In some implementations, the command can indicate a status of an issue identified in the support ticket from which the remote computing device was identified. In such implementations, upon terminating the hidden desktop, the RMS may update or close the support ticket associated with the remote computing device. For example, in response to receiving the command (e.g., terminate the hijacked system session, to close the ticket, etc.) from the host computing device, the RMS may communicate with a support server to close the support ticket. Updating the support ticket can include recording one or more actions performed on the remote computing device via the hidden desktop (e.g., monitored by the RMS during via the connection between the remote computing device and the host computing device) to address one or more issues identified in the support ticket.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a stand-alone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer-readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer-readable medium that is executed by a processor. The computer-readable programs can be implemented in a programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method, comprising:
    establishing, by a remote management server, a connection between a remote computing device and a host computing device;
    transitioning, by the remote management server, a system session executing on the remote computing device to an interactive state;
    displaying, by the remote management server on the host computing device, a hidden desktop within the transitioned system session;
    presenting, by the remote management server, a user interface on the hidden desktop, the user interface comprising an icon that launches a second application of the remote computing device within the transitioned system session; and
    terminating, by the remote management server responsive to a command from the host computing device, the hidden desktop.

2. The method of claim 1, wherein presenting the user interface comprises presenting a plurality of icons that each launch a respective application of the remote computing device within the transitioned system session.

3. The method of claim 1, further comprising presenting, by the remote management server on the host computing device, a second icon in the user interface that presents a second user interface comprising a list of files stored on the remote computing device.

4. The method of claim 1, further comprising presenting, by the remote management server on the host computing device, a second icon in the user interface that presents a second user interface comprising a field that accepts text input.

5. The method of claim 1, further comprising presenting, by the remote management server, a menu within the hidden desktop having entries to terminate the second application, launch a second instance of the second application, and close the menu.

6. The method of claim 1, further comprising determining, by the remote management server, that a permission associated with the host computing device permits access to the hidden desktop.

7. The method of claim 1, further comprising identifying, by the remote management server, the remote computing device based on a support ticket.

8. The method of claim 7, further comprising updating, by the remote management server, a status of the support ticket based on instructions executed within the system session executing on the remote computing device.

9. The method of claim 1, wherein transitioning the system session executing on the remote computing device to the interactive state comprises modifying, by the remote management server, a registry of an operating system of the remote computing device.

10. The method of claim 1, further comprising terminating, by the remote management server, the hidden desktop in response to an interaction with a second icon presented in the user interface.

11. A system, comprising:
    a remote management server comprising one or more processors executing instructions stored in memory that, when executed, cause the remote management server to:
    establish a connection between a remote computing device and a host computing device;
    transition a system session executing on the remote computing device to an interactive state;
    display, on the host computing device, a hidden desktop within the transitioned system session;
    present a user interface on the hidden desktop, the user interface comprising an icon that launches a second application of the remote computing device within the transitioned system session; and
    terminate, responsive to a command from the host computing device, the hidden desktop.

12. The system of claim 11, wherein the remote management server presents the user interface by presenting a plurality of icons that each launch a respective application of the remote computing device within the transitioned system session.

13. The system of claim 11, wherein the remote management server presents, on the host computing device, a second icon in the user interface that presents a second user interface comprising a list of files stored on the remote computing device.

14. The system of claim 11, wherein the remote management server presents, on the host computing device, a second icon in the user interface that presents a second user interface comprising a field that accepts text input.

15. The system of claim 11, wherein the remote management server presents a menu within the hidden desktop having entries to terminate the second application, launch a second instance of the second application, and close the menu.

16. The system of claim 11, wherein the remote management server determines that a permission associated with the host computing device permits access to the hidden desktop.

17. The system of claim 11, wherein the remote management server identifies the remote computing device based on a support ticket.

18. The system of claim 17, wherein the remote management server updates a status of the support ticket based on instructions executed within the system session executing on the remote computing device.

19. The system of claim 11, wherein the remote management server transitions the system session executing on the remote computing device to the interactive state by modifying a registry of an operating system of the remote computing device.

20. The system of claim 11, wherein the remote management server terminates the hidden desktop in response to an interaction with a second icon presented in the user interface.

* * * * *